United States Patent [19]

Ito et al.

[11] Patent Number: 5,191,953

[45] Date of Patent: Mar. 9, 1993

[54] ELECTRONICALLY CONTROLLED AUTOMATIC TRANSMISSION

[75] Inventors: Yasunobu Ito, Okazaki; Yasuo Mizuno, Chiryu, both of Japan

[73] Assignee: Aisin Aw Co., Ltd., Japan

[21] Appl. No.: 740,847

[22] Filed: Aug. 7, 1991

[30] Foreign Application Priority Data

Aug. 15, 1990 [JP] Japan ............................ 2-214312

[51] Int. Cl.$^5$ ............................................ B60K 20/00
[52] U.S. Cl. ................................... 180/197; 74/857; 364/424.1; 364/426.02; 364/426.03
[58] Field of Search .................. 180/197; 74/857; 364/424.1, 426.02, 426.03

[56] References Cited

U.S. PATENT DOCUMENTS 5,067,578 11/1991 Shirata et al. ................. 180/197
5,137,105 8/1992 Suzuki et al. ................. 364/424.1

FOREIGN PATENT DOCUMENTS 63937 3/1990 Japan ................................ 180/197
197433 8/1990 Japan ................................ 180/197

Primary Examiner—Mitchell J. Hill
Attorney, Agent, or Firm—Lorusso & Loud

[57] ABSTRACT

An electronically controlled automatic transmission installed on a vehicle. This transmission comprises a throttle body, a main throttle valve mounted in the throttle body, a subsidiary throttle valve connected in series with the main throttle valve, a traction control module connected with wheel rotation sensors, an engine control module receiving the output signals from the main and subsidiary throttle sensors, a transmission control module, and an automatic transmission. If the wheels skid, it is detected by the traction control module. The output signal from the traction control module causes the engine control module to reduce the engine torque. The transmission control module responds to the output signal from the traction control module and to the engine control module, and changes the line pressure. When the traction control module is operating, the transmission control module changes the line pressure by a predetermined value.

1 Claim, 30 Drawing Sheets

Fig. 9

Table of Data on Division of Sub. Throttle

| Address | Data(%) |
|---|---|
| F000 | 25 |
| F001 | 50 |
| F002 | 75 |
| F003 | 100 |

Fig.11(A)

Table of Data on Division Point of Main Throttle normal condition

| Address | Data |
|---|---|
| F100 | 10 |
| . | 20 |
| . | 30 |
| . | 40 |
| . | 50 |
| . | 60 |
| . | 70 |
| . | . |
| F100+n | 100 |

Fig.11(B)

when traction is under control

| Address | Data | Address | Data | Address | Data |
|---|---|---|---|---|---|
| F200 | 30 | F300 | 20 | F400 | . |
| . | 60 | . | 40 | . | . |
| . | 100 | . | 60 | . | . |
| | | . | 80 | . | . |
| | | . | 100 | . | . |

Fig.11(C)

| Address | Data | | |
|---|---|---|---|
| F010 | F200( | ad. data, 2 bytes | ) |
| F012 | F300( | ↑ | ) |
| F014 | F400( | ↑ | ) |
| F016 | F500( | ↑ | ) |

Fig.16

Table of Data on Division of Sub. Throttle

| Address | Data(%) |
|---------|---------|
| F000    | 2 5     |
| F001    | 5 0     |
| F002    | 7 5     |
| F003    | 1 0 0   |

Fig.18(A)

Table of Data on Division Point of Main Throttle normal condition

| Address  | Data |
|----------|------|
| F100     | .    |
| :        | :    |
| F100+n   | .    |

Fig.18(B)

when traction is under control

| Address | Data | Address | Data | Address | Data |
|---------|------|---------|------|---------|------|
| F200    | .    | F300    | .    | F400    | .    |
| :       | 100  | :       | :    | :       | :    |
|         |      |         | 100  |         | :    |
|         |      |         |      |         | 100  |

Fig.18(C)

| Address | Data   |                     |
|---------|--------|---------------------|
| F010    | F200 ( | ad. data, 2 bytes ) |
| F012    | F300 ( | ↑           )       |
| F014    | F400 ( | ↑           )       |
| F016    | F500 ( | ↑           )       |

Fig.24

(F900 + number of gears × 2)

| | |
|---|---|
| F900 | FA00 |
| F902 | FB00 |
| F904 | FC00 |
| F906 | FD00 |

Fig.25

| step | 1st speed | | 2nd speed | 3rd speed | 4th speed |
|---|---|---|---|---|---|
| 0 | FA00 | 0.5kg/cm² | FB00 | FC00 | FD00 |
| 1 | FA01 | 0.6kg/cm² | | | |
| 2 | FA02 | . | | | |
| 3 | | . | | | |
| 4 | | . | | | |
| 5 | | . | | | |

ELECTRONICALLY CONTROLLED AUTOMATIC TRANSMISSION

FIELD OF THE INVENTION

The present invention relates to an electronically controlled automatic transmission.

BACKGROUND OF THE INVENTION

The prior art electronic control system for an automatic transmission provides various electronic controls, such as upshifts and downshifts employing solenoid valves, engagement and disengagement of the clutch of the lockup torque converter, control of the line pressure, and control of the engine torque.

In the prior art automatic transmission, the line pressure for engaging the clutch that produces a shift or for applying the brakes is established, using the throttle opening as a parameter, whether the transmission is controlled electronically or hydraulically. The throttle opening is used, because it represents the characteristics of the engine torque. Therefore, the hydraulically controlled automatic transmission uses a throttle cable. On the other hand, in the electronically controlled automatic transmission, the throttle opening is transformed into an electrical signal, and the line pressure is adequately controlled. In this way, a suitable feeling is given to the driver of the automobile when a shift is produced.

In recent years, vehicles have begun to be equipped with a traction control system which permits the vehicle to go while reducing the torque by a given amount, in order to improve the operating performance and the safety of the vehicle on bad roads and under bad weather conditions. This system is disclosed in Japanese Patent Laid-Open No. 117443/1990. When a vehicle equipped with this traction control system is running on a gravel road, if the driving wheels skid and the driver keeps pushing down on the accelerator pedal, the engine torque is automatically reduced. This assures that the vehicle runs smoothly.

When a vehicle equipped with the above-described electronically controlled automatic transmission is going on a road surface of a small friction coefficient such as a snowy road, if the driving wheels skid, the engine torque is reduced by the traction control function. At this time, the automatic transmission may not make a smooth shift, producing a shock.

Specifically, the signal produced from the throttle sensor used in the prior art system for the automatic transmission indicates the position of the accelerator pedal that the driver presses down on. The throttle opening remains the same if the position of the accelerator pedal is not shifted, whether the traction control function is being performed or not.

When the driving wheels skid, the output torque from the engine is decreased actually by the control of the traction. In spite of this decrease, the accelerator pedal remains depressed, thus producing the same line pressure. The automatic transmission is controlled by this constant line pressure.

Essentially, the line pressure should be set to appropriate values according to the output torque from the engine. As described above, when the traction control function is performed, excessive line pressure is applied to a hydraulic servo such as the clutch for producing shifts or the brakes and so a shift is made in an abnormally short time, thus producing a great shock.

When the wheels are skidding, if the driver further presses down on the accelerator pedal, a downshift is produced. Then, the driving force is increased, leading to an increase in the amount of skid. This makes it impossible to appropriately control the traction.

SUMMARY OF THE INVENTION

It is an object of the present invention to provide an electronically controlled automatic transmission which is installed on a vehicle and which prevents excessively quick shifts as well as shifts causing shock while the traction control function is being performed.

The above object is achieved in accordance with the teachings of the invention by an electronically controlled automatic transmission installed on a vehicle, said transmission comprising skid-detecting means for detecting skid of the wheels, traction control means which receive the output signals from the skid-detecting means and produce a signal for reducing the engine torque, engine control means which reduce the engine torque according to the output signal from the traction control means, and a transmission control unit which receives at least one of the output signal from the traction control means and the output signal from the engine control means and changes the line pressure. The transmission control unit has a means for reducing the line pressure by a preset amount when the traction control function is being performed.

As described above, the novel electronically controlled automatic transmission comprises the skid-detecting means for detecting skid of the wheels, the traction control means which receive the output signals from the skid-detecting means and produce a signal for reducing the engine torque, the engine control means which reduce the engine torque according to the output signal from the traction control means, and the transmission control unit which receives at least one of the output signal from the traction control means and the output signal from the engine control means and changes the line pressure.

If the driving wheels skid, the traction control means reduce the engine torque in response to the output signals from the skid-detecting means. The transmission control unit reduces the line pressure by a preset value while the traction control function is being performed.

Accordingly, where the output torque from the engine is decreased in practice by the control of the traction as encountered when the driving wheels skid though the position of the accelerator pedal remains the same, the line pressure for the transmission is set to an appropriate value according to the output torque from the engine. As a result, excessive line pressure is prevented from being applied to a hydraulic servo such as the clutch for producing shifts or the brakes; otherwise shifts would be made in extraordinarily short times. Also, it is unlikely that a great shock is produced when a shift is produced.

Other objects and features of the invention will appear in the course of the description thereof which follows.

BRIEF DESCRIPTION OF THE DRAWINGS

FIG. 9 is a table showing one example of a set of data about the division of the subsidiary throttle, the table being used to calculate step values;

FIG. 11(A) is a table of data about the division points of the main throttle under normal condition;

FIG. 11(B) shows tables of data about the division point of the main throttle when the traction function is being performed;

FIG. 11(C) is a table comparing data with addresses, for selecting one out of the tables of data about the division point of the main throttle when the traction function is being performed;

FIG. 16 is a table of one example of a set of data about the division of the subsidiary throttle, the table being used for calculation of step values;

FIG. 18(A) is a table of data about the division point of the main throttle under normal condition;

FIG. 18(B) shows tables of data about the division point of the main throttle when the traction control function is being performed;

FIG. 18(C) is a table comparing data with addresses, for selecting one out of the tables of data about the division point of the main throttle when the traction control function is being performed;

FIG. 24 is a table of data about the line pressure, containing addresses corresponding to the items of the data;

FIG. 25 is a diagram illustrating one example of a set of data about the line pressure;

DETAILED DESCRIPTION OF THE INVENTION

Figure 1:
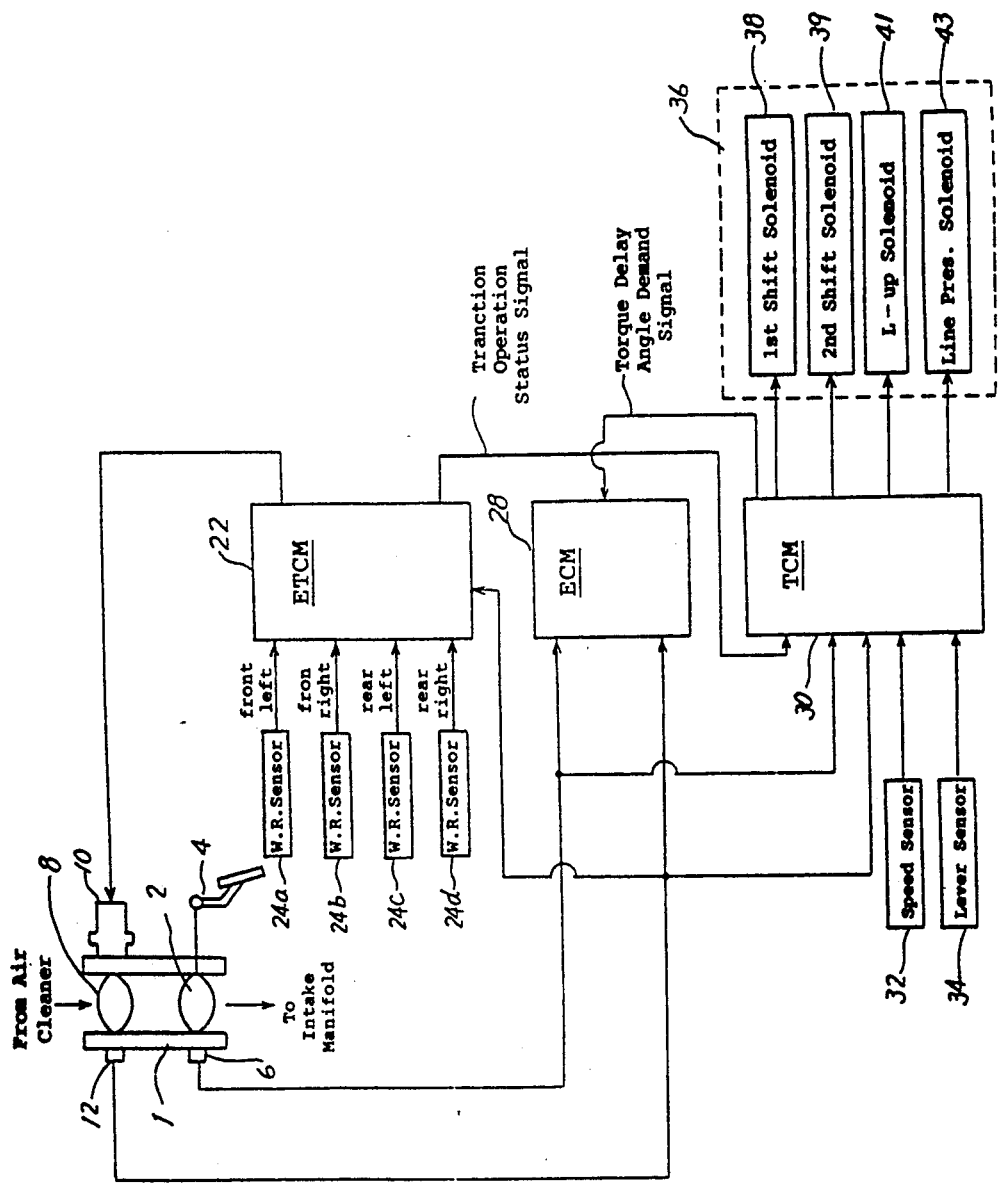
FIG. 1 is a schematic view of an electronically controlled automatic transmission according to the invention.

Referring to FIG. 1, an electronically controlled automatic transmission according to the invention is schematically shown. The throttle body of the automobile on which this automatic transmission is installed is indicated by numeral 1. Air is drawn by the throttle body 1 through an air cleaner and supplied into the intake manifold. A main throttle valve 2 is swingably mounted to the throttle body 1. The flow of the air is adjusted by pressing down on the throttle pedal 4 more or less. The degree to which the main throttle valve 2 is opened is detected by a main throttle sensor 6.

A subsidiary throttle valve 8 is disposed in series with the main throttle valve 2 in the throttle body 1. The subsidiary throttle valve 8 is opened and closed by a subsidiary throttle actuator 10 consisting of a stepping motor. The degree to which the subsidiary throttle valve 8 is opened is detected by a subsidiary throttle sensor 12.

An electronic traction control module (ETCM) 22 receives signals from wheel rotation sensors 24a-24d disposed at the four wheels, respectively. If a skid occurs, the traction control module closes the subsidiary throttle valve 8 via the subsidiary throttle actuator 10, reducing the torque. At the same time, the module 22 sends a signal indicative of the traction control to a transmission control module (TCM) 30 (described later).

An engine control module (ECM) 28 receives signals from the subsidiary throttle sensor 12 and from the main throttle sensor 6, and controls the flow of fuel according to the flow of air. Also, the engine control module 28 receives a torque delay angle demand signal from the transmission control module 30 and adjusts the engine torque.

A transmission control module (TCM) 30 receives signals from a vehicle speed sensor 32 and from a shift lever position sensor 34. This module 30 also receives the signal indicative of the traction control from the traction control module 22 to control the automatic transmission 36. To provide control of the automatic transmission 36, a first solenoid 38, a second solenoid 39, a lockup solenoid 41, and a line pressure solenoid 43 are operated.

In the operation of the electronically controlled automatic transmission of the construction described above, the traction control module 22 determines whether the driving wheels are skidding according to the signals from the wheel rotation sensors 24a-24d mounted to the wheels. If the amount of the skid is in excess of a given value, the subsidiary throttle actuator 10 attached to the throttle body 1 is operated to close the subsidiary throttle valve 8, thus reducing the engine power. In this way, the skid ceases, and the vehicle can run smoothly.

Figure 2:
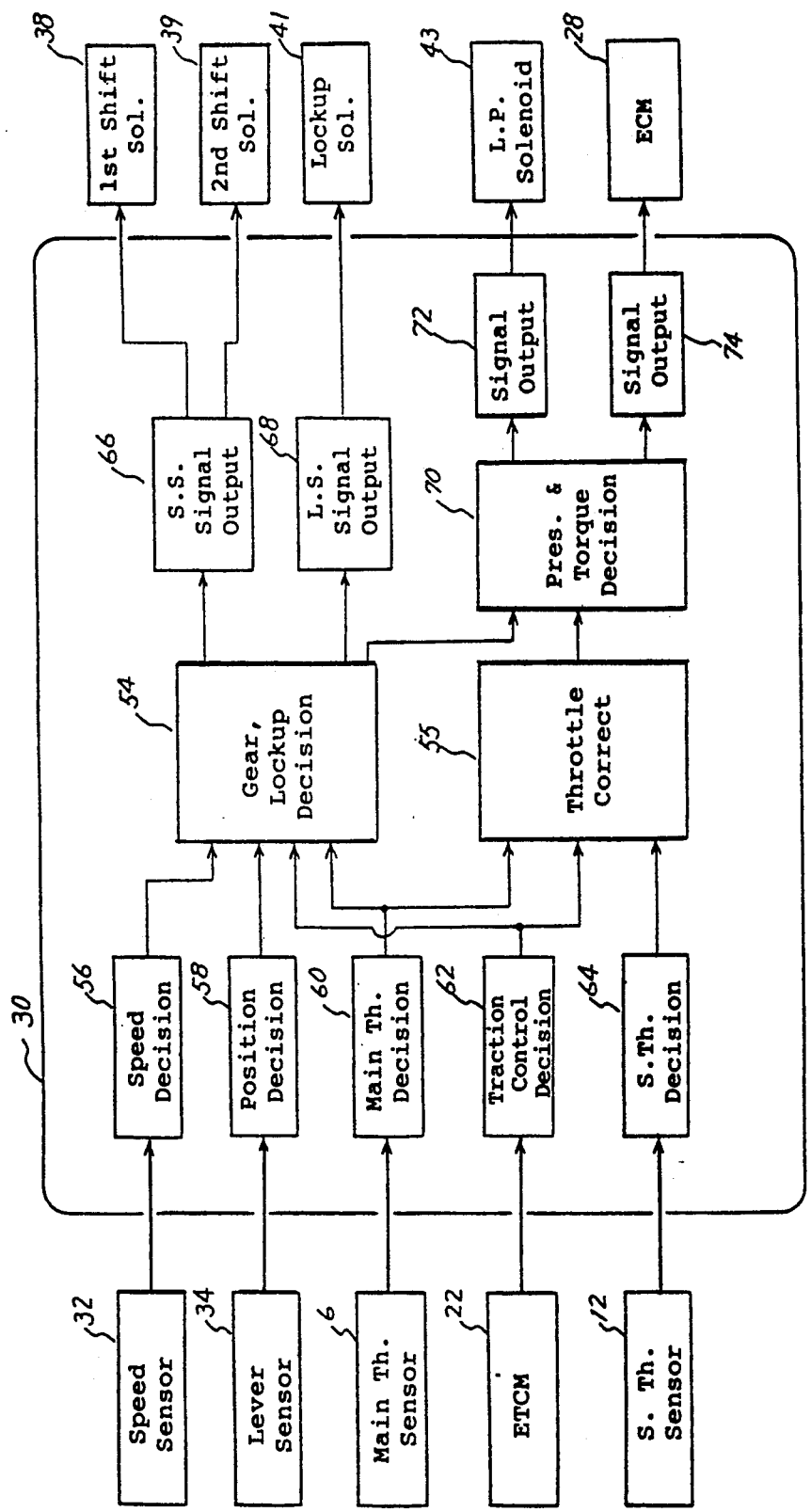
FIG. 2 is a block diagram of the electronically controlled automatic transmission shown in FIG. 1.

The electronically controlled automatic transmission described thus far in connection with FIG. 1 is shown in FIG. 2 in block diagram. The vehicle speed sensor 32, the shift lever position sensor 34, the main throttle sensor 6, the traction control module 22, and the subsidiary throttle sensor 12 described above are shown. Also shown are an engaged gear-and-lockup status decision means 54 and a throttle opening-correcting means 55 for controlling the line pressure and the engine torque. The engaged gear-and-lockup status decision means 54 receives signals from a vehicle speed decision means 56, from a shift lever position decision means 58, from a main throttle opening decision means 60, and from a traction control operation decision means 62, and determines which of the gears should be engaged and whether the lockup clutch should be engaged or disengaged. Furthermore, the status decision means 54 establishes the line pressure.

For these purposes, the engaged gear-and-lockup status decision means 54 sends signals to a shift solenoid signal output means 66 and to a lockup solenoid signal output means 68 to energize the first shift solenoid 38, the second shift solenoid 39, and the lockup solenoid 41.

The throttle opening-correcting means 55 for controlling the line pressure and the engine torque receives signals from the main throttle opening decision means 60, from the traction control operation decision means 62, and from a subsidiary throttle opening decision means 62, and corrects the degree to which the throttle is opened. Then, the correcting means 55 produces a signal to a line pressure-and-engine torque control status decision means 70.

The line pressure-and-engine torque control status decision means 70 determines the line pressure and the engine torque produced when a shift is made, based on the signal from the engaged gear-and-lockup status decision means 54 and on the signal from the throttle opening-correcting means 55 for controlling the line pressure and the engine torque. The status decision means 70 then operates the line pressure solenoid 43 and the engine control module 28 via a line pressure solenoid signal output means 72 and an engine torque control signal output means 74.

In the electronically controlled automatic transmission of the structure described above, when the traction controls status signal from the traction control module 22 and the output signal from the subsidiary throttle sensor 12 are applied to the transmission control module 30, these signals are sent to the throttle opening-correcting means 55 for controlling the line pressure and the engine torque, together with the information from the main throttle opening decision means 60, via the traction control operation decision means 62 and the subsidiary throttle opening decision means 64.

In the throttle opening-correcting means 55 for controlling the line pressure and the engine torque, if the traction control function is not performed, the information which has been sent from the main throttle opening decision means 60 is directly taken as the opening of the throttle for controlling the line pressure and the engine torque. The information is sent to the line pressure-and-engine torque control status decision means 70. Then, the pressure and the torque are controlled in a conventional manner.

On the other hand, if the traction control function is performed, the actual engine torque is reduced by the action of the subsidiary throttle actuator 10. Therefore, the subsidiary throttle opening is taken into account in relation to the main throttle opening signaled from the main throttle opening decision means 60. The throttle opening corrected according to the actual engine torque is taken as the throttle opening for the control of the line pressure and the engine torque, and the line pressure-and-engine torque control status decision means 70 is informed of this corrected throttle opening. Then this decision means 70 determines the status of the control of the line pressure and of the engine torque.

One method of correcting the throttle opening for the control of both line pressure and engine torque according to the subsidiary throttle opening obtained during the control of the traction consists in performing experiments in practice to obtain data about the engine torque, obtaining correcting values based on the data, holding the correcting values in a data map where the subsidiary throttle opening is a parameter, reading data from the data map, and using the data. In another method, the opening of the main throttle is multiplied by the degree (0-100%) to which the subsidiary throttle is opened to correct the throttle opening. This corrected throttle opening is used as the throttle opening.

The information from the traction control operation decision means 62 is also sent to the engaged gear-and-lockup status decision means 54, to inhibit downshifts during the control of the traction. Thus, when the driving wheels are skidding, even if the driver further pushes down on the accelerator pedal, a downshift is prevented; otherwise the driving force would be increased, thus increasing the amount of skid further.

Figure 3A:
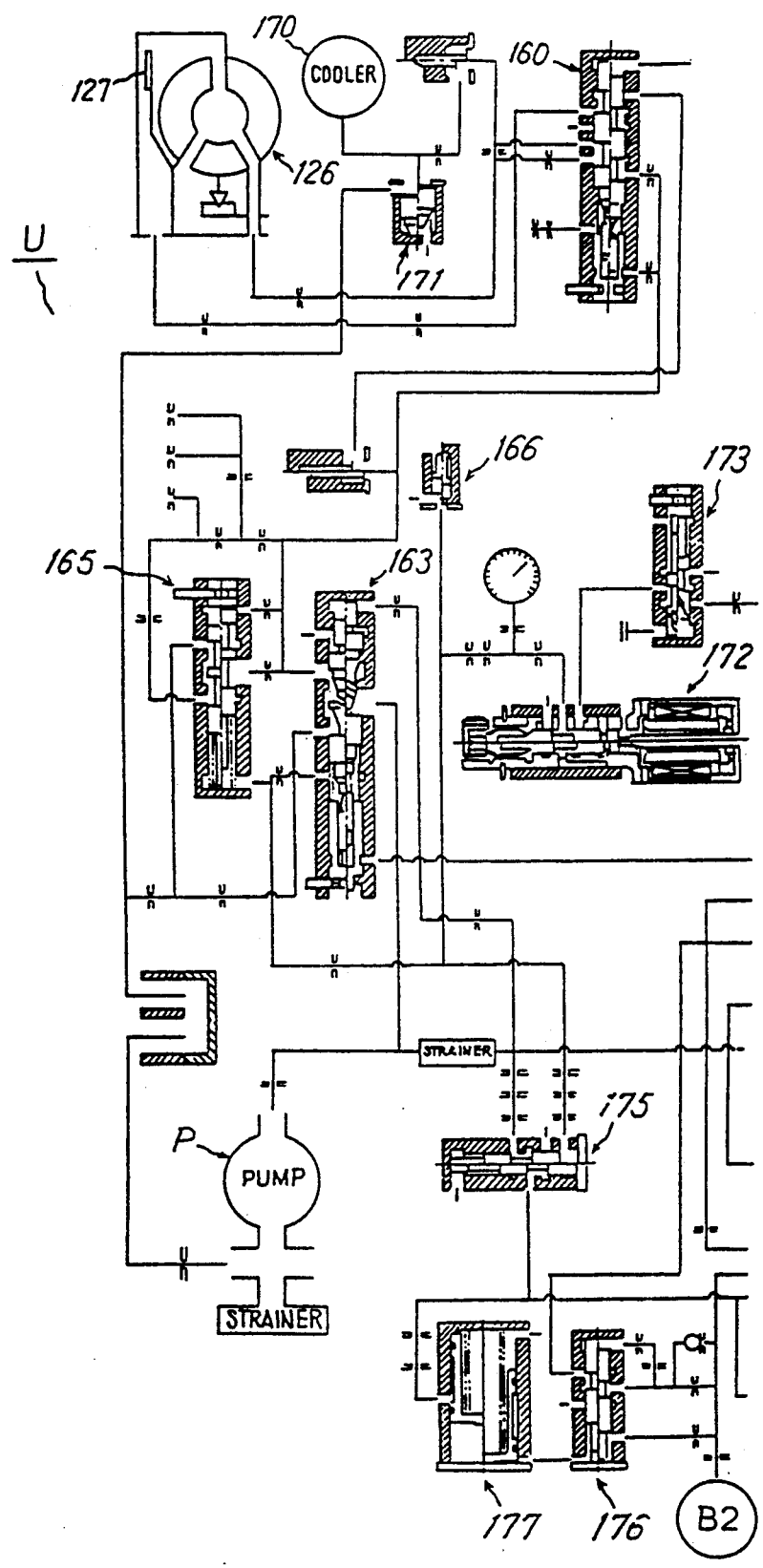
FIG. 3 is a diagram of a hydraulic circuit used in the electronically controlled automatic transmission shown in FIGS. 1 and 2.
Figure 3B:
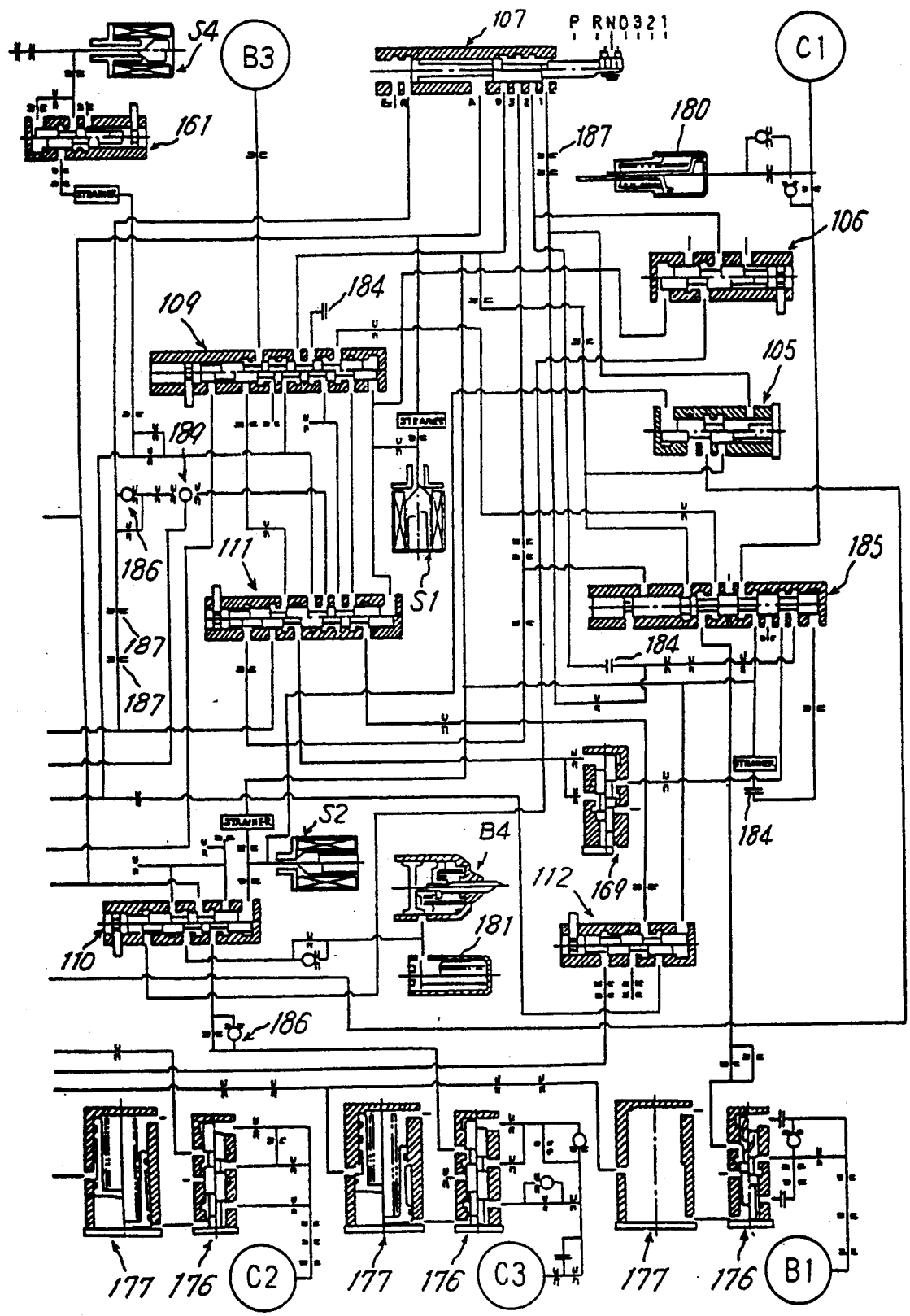
Figure 4A:
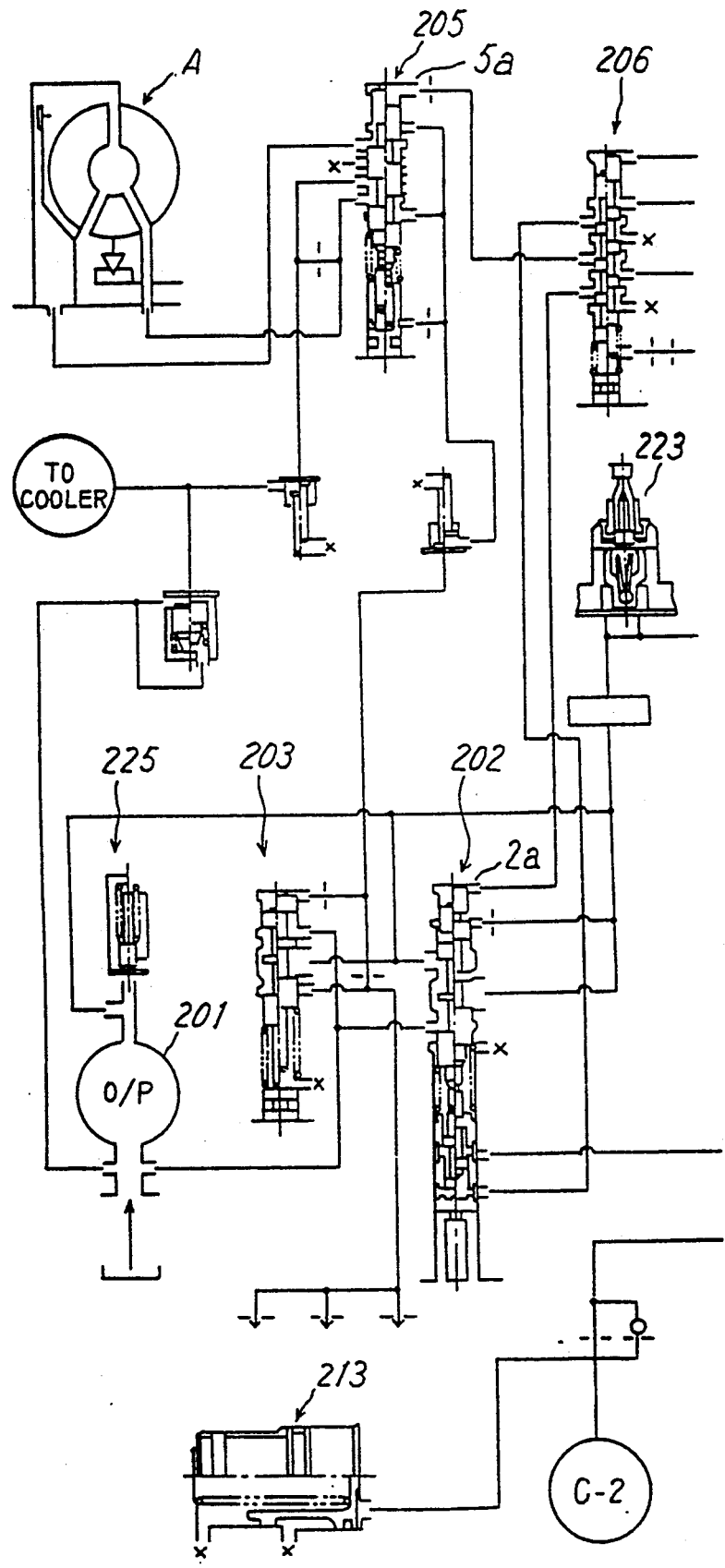
FIG. 4 is a diagram of another hydraulic circuit which can be used in the electronically controlled automatic transmission shown in FIGS. 1 and 2.
Figure 4B:
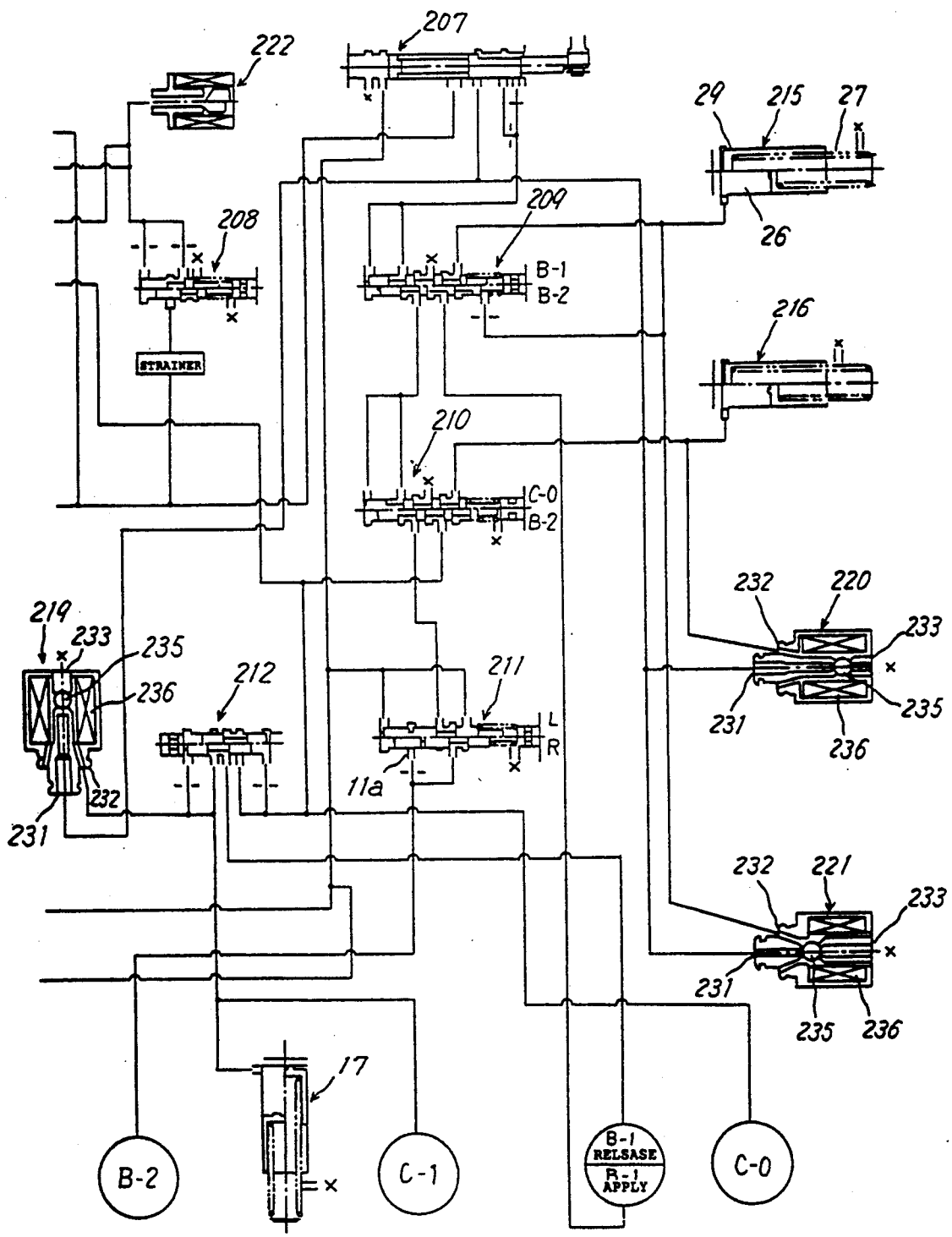

A hydraulic circuit incorporated in the electronically controlled automatic transmission of the construction described above is next described. FIG. 3 is a diagram of this hydraulic circuit. FIG. 4 is a diagram of another hydraulic circuit which can be incorporated in this novel automatic transmission. In FIG. 3, the hydraulic circuit is indicated by U and comprises hydraulic servos C1, C2, C3 for clutches $C_1$, $C_2$, $C_3$, respectively, and hydraulic servos B1, B2, B3, B4 for the brakes $B_1$, $B_2$, $B_3$, $B_4$, respectively. Also shown are a manual valve 107, a 1–2 (first to second) shift valve 109, a 2–3 (second to third) shift valve 110, a 3–4 (third to fourth) shift valve 111, a first solenoid valve S1, and a second solenoid valve S2. The first solenoid valve S1 controls the 1–2 shift valve 109 and the 3–4 shift valve 111, i.e., this first valve S1 is the first shift solenoid 38 shown in FIG. 1. The second solenoid valve S2 controls the 2–3 shift valve 110, i.e., this second valve S2 is the second shift solenoid 39 shown in FIG. 1.

A first emergency control valve 105 and a second emergency control valve 106 act as backup means when the solenoid valves S1 and S2 respectively break down, e.g., the wires extending through them break and they are deenergized. A sequence valve 112 is used for the first brake $B_1$.

Also included in the hydraulic circuit are a lockup control valve 160, a fourth solenoid valve S4, and a lockup modulator valve 161. The fourth solenoid valve S4 controls the duty cycle of the pulses applied to the lockup control valve 160, i.e., this valve S4 is the lockup solenoid valve 41 shown in FIG. 1. The modulator valve 161 serves to stabilize the control of the duty cycle provided by the fourth solenoid valve S4.

A primary regulator valve 163 regulates the hydraulic pressure supplied from a pump P and forms a line pressure. A secondary regulator valve 165 regulates the line pressure to form hydraulic pressure used for lubricating purposes. Also shown are a pressure relief valve 166, a low modulator valve 169, an oil cooler 170, and a cooler bypass valve 171.

A line pressure solenoid 172 consists of a linear solenoid valve and is controlled by the transmission control module 30 of the novel electronically controlled automatic transmission. A signal hydraulic pressure formed by the line pressure solenoid 172 is sent to the primary regulator valve 163 to adjust the line pressure. A solenoid modulator valve 173 stabilizes the control of the line pressure solenoid 172.

Also shown are an accumulator control valve 175, a torque converter 126, a lockup clutch 127, and the aforementioned hydraulic pump P. Pressure-adjusting valves 176 and accumulators 177 are in communication with the servo B1 for the first brake, the hydraulic servo C2 for the second clutch, the hydraulic servo C3 for the third clutch, and the hydraulic servo B2 for the second brake, respectively. Accumulators 180 and 181 each mounted in a casing are in communication with the hydraulic servo C1 for the first clutch and the hydraulic servo B4 for the fourth brake, respectively.

In FIG. 3, symbol 184 "=" inserted in the oil passage indicates that the oil passage is cut off by a separator plate.

A 4–5 (fourth to fifth) shift valve 185 is used for the fifth speed. The control oil chamber in this valve is not closed off by a separator. This permits the hydraulic control module U for the four-speed automatic transmission to be used also as the valve body of a five-speed automatic transmission. Check valves 186 each equipped with an orifice are disposed at appropriate positions. Indicated by 187 are orifices. Indicated by 189 is a three-way selector valve.

In the hydraulic circuit of the construction described thus far, the signal hydraulic pressure, such as throttle pressure, produced by the line pressure solenoid 172 is sent to the primary regulator valve 163 to regulate the line pressure. Then, the regulated line pressure is supplied to the hydraulic servos C1–C3, B1–B4. As shown in FIG. 4, the hydraulic pressure regulated by the line pressure solenoid can be directly supplied to the hydraulic servos.

Referring to FIG. 4, there are shown an oil pump 201, a primary regulator valve 202, a secondary regulator valve 203, a lockup control valve 205, a lockup relay valve 206, a manual valve 207, and a modulator valve 208. Also shown are a B-1 relay valve 209, a C-0 relay valve 210, a low modulator valve 211, a B-1 release relay valve 212 used for making a shift, an accumulator 213 for the hydraulic servo C-2, a damping valve 215 for the B-1 relay valve, and a damping valve 216 for the C-0 relay valve.

A solenoid valve 219 for the hydraulic servo C-1, a solenoid valve 220 for the relay valve C-0, and a solenoid valve 221 for the hydraulic servo B-1 act to supply oil to, and receive oil from, the hydraulic servos C0–C2, B1, B2. Furthermore, these solenoid valves adjust the hydraulic pressure at the same time. These solenoid valves 219–221 combine the function of the shift solenoids 38, 39 shown in FIG. 1 with the function of the line pressure solenoid 43. A lockup solenoid valve 222 corresponds to the lockup solenoid 41 shown in FIG. 1. Also shown are an oil temperature sensor 223 and a pressure relief valve 225.

Each of the solenoid valves 219, 220, and 221 used for producing shifts is a three-way valve. Each valve has an input port 231 into which the line pressure is supplied, an output port 232, and a drain port 233. A ball 235 which selectively opens and closes the input port 231 and the drain port 233 is movably installed in each valve.

In each of the C-1 solenoid valve 219 and the C-0 solenoid valve 220, when a coil 236 is energized, the ball 235 closes the input port 231 and opens the drain port 233. When the coil 236 is not energized, the ball opens the input port 231 and closes the drain port 233.

In the solenoid valve 221 for the relay valve B-1, when the coil 236 is not energized, the ball 235 closes the input port 231 and opens the drain port 233. When the coil 236 is energized, the ball opens the input port 231 and closes the drain port 233.

Figure 5:
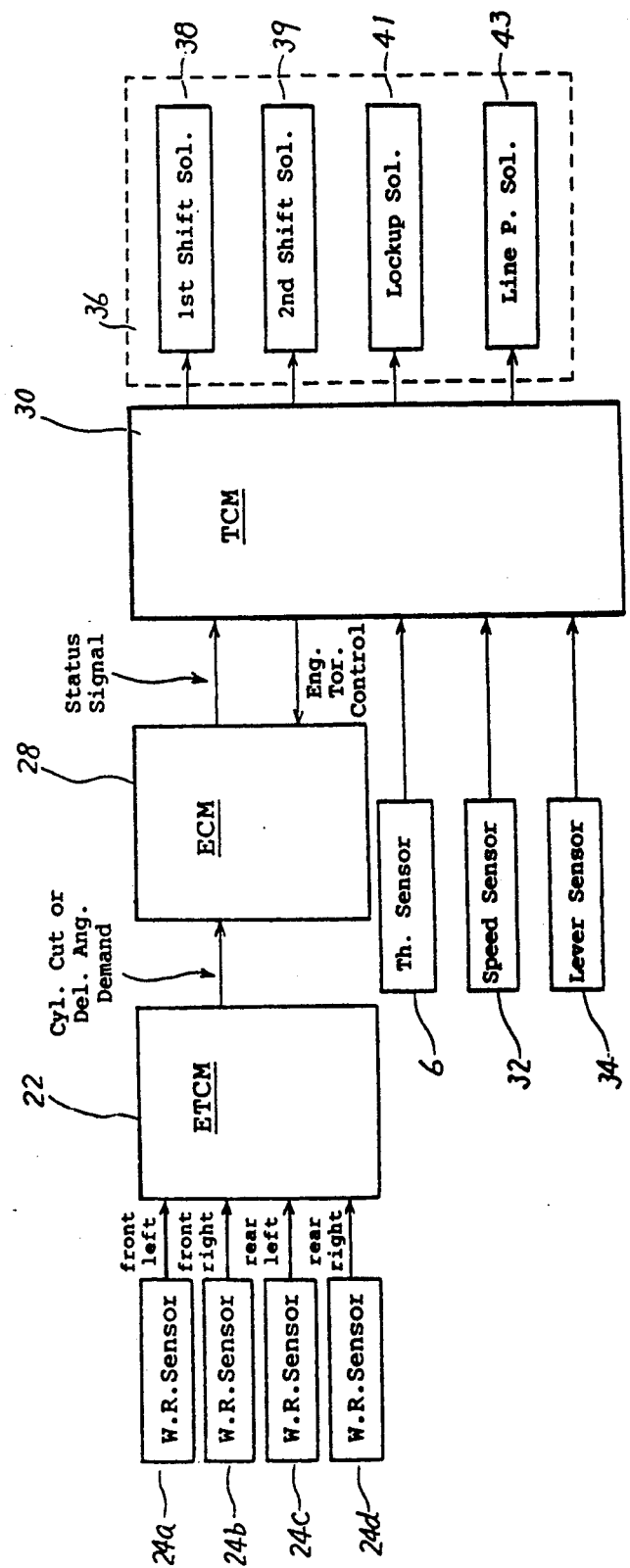
FIG. 5 is a schematic view of another electronically controlled automatic transmission according to the invention.

Another electronically controlled automatic transmission according to the invention is next described. This transmission is schematically shown in FIG. 5. Shown in FIG. 5 are wheel rotation sensors 24a–24d, a traction control module 22, an engine control module 28, a throttle sensor 6, a vehicle speed sensor 32, a shift lever position sensor 34, a transmission control module 30, an automatic transmission 36, a first solenoid 38, a second solenoid 39, a lockup solenoid 41, and a line pressure solenoid 43.

In the same way as in the example described first, the traction control module 22, the engine control module 28, the transmission control module 30, and various input and output signals form an electronically controlled automatic transmission according to the invention. The engine control module 28 controls either the number of the cut cylinders or the ignition timing delay angle according to the signal from the traction control module 22. Thus, the engine torque is reduced.

The traction control module 22 determines whether the driving wheels are skidding or not according to the signals from the wheel rotation sensors 24a–24d mounted at the wheels. If the amount of the skid is in excess of a certain value, the traction control module 22 sends a cylinder cutoff signal or a delay angle demand signal to the engine control module 28, which then reduces the number of the cylinders or controls the ignition timing delay angle according to its input signal to thereby reduce the engine output. In this way, the skid is made to cease, and the vehicle can go smoothly.

At the same time, the engine control module 28 sends a signal indicating the cutoff of the cylinders or a signal indicating the delay angle to the transmission control module 30. This transmission control module 30 delivers output signals to solenoids 38, 39, 41, 43 mounted to the automatic transmission 36. Also, the transmission control module 30 produces an engine torque control signal for controlling the output torque from the engine to the engine control module 28, in the same way as in the example described already in connection with FIGS. 1-4.

Figure 6:
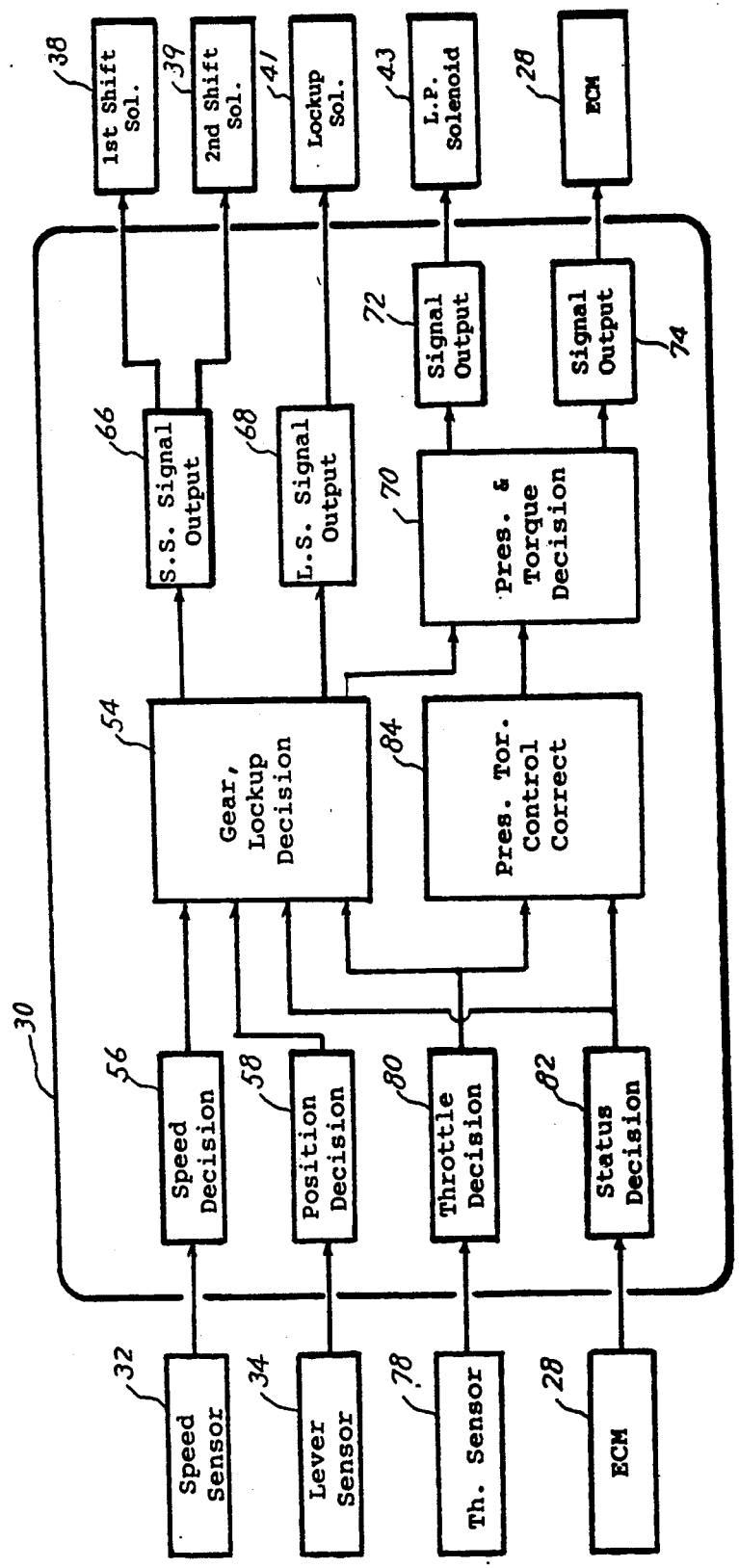
FIG. 6 is a block diagram of the electronically controlled automatic transmission shown in FIG. 5.

FIG. 6 is a block diagram of the electronically controlled automatic transmission shown in FIG. 5. Shown in FIG. 6 are the vehicle speed sensor 32, the shift lever position sensor 34, the throttle sensor 78, and the engine control module 28. This module 28 produces an output signal indicating the cutoff of the cylinders or an output signal indicating the delay angle. Also shown in FIG. 6 are a vehicle speed decision means 56, a shift lever position decision means 58, a throttle opening decision means 80, and a cylinder cutoff-and-delay angle decision means 82. These means 56, 58, 80, 82 receive signals from the sensors 32, 34, 78, and from the engine control module 28.

Also shown in FIG. 6 are an engaged gear-and-lockup status decision means 54, a line pressure-and-engine torque control correcting means 84, a shift solenoid signal output means 66, a lockup solenoid signal output means 68, a line pressure-and-engine torque control status decision means 70, a line pressure solenoid signal output means 72, and an engine torque control signal output means 74.

The first shift solenoid 38 and the second shift solenoid 39 operate in response to the output signal from the shift solenoid signal output means 66. The lockup solenoid 41 is operated by the lockup solenoid signal output means 68. The line pressure solenoid 43 and the engine control module 28 are operated by the line pressure-and-engine torque control status decision means 70 and the engine torque control signal output means 74, respectively.

In the electronically controlled automatic transmission of the construction described above, when the traction is controlled, the cylinder cutoff-and-delay angle status signal from the engine control module 28 is applied to the transmission control module 30. The information from the cylinder cutoff-and-delay angle decision means 82 is sent to the line pressure-and-engine torque control correcting means 84.

In this line pressure-and-engine torque control correcting means 84, if the traction control function is not performed, i.e., neither the cutoff of the cylinders nor a delay of the angle occurs and normal control is provided, then no correction is made. Then, information from the throttle opening decision means 80 is directly sent to the line pressure-and-engine torque control status decision means 70, and control is provided in a conventional manner.

On the other hand, if the traction control function is performed, i.e., the cylinder cutoff-and-delay angle status signal from the engine control module 28 indicates either the cutoff of the cylinders or the control of the delay angle, then the throttle opening that represents the engine output is made to respond to the engine torque actually occurring at that time, according to the number of the cut cylinders or the delay angle determined by the cylinder cutoff-and-delay angle decision means 82. A signal indicating the corrected throttle opening is sent to the line pressure-and-engine torque control status decision means 70, which then determines the status of the control of the line pressure and the engine torque according to the incoming signal.

One method of correcting the throttle opening according to either the number of the cut cylinders or the delay angle consists in performing experiments in practice to obtain data about the engine torque, obtaining correcting values based on the data, holding the correcting values in a data map where either the number of the cut cylinders or the delay angle is a parameter, reading data from the data map, and correcting the throttle opening using the data. In another method, the opening of the throttle is multiplied by the ratio of the number of the cut cylinders or the ratio of the amount of the delay angle.

In the same way as in the example described already in connection with FIGS. 1-4, the information from the cylinder cutoff-and-delay angle status decision means 82 is also sent to the engaged gear-and-lockup status decision means 54. During the control of the traction, downshifts are inhibited. When the driving wheels are skidding, if the driver further pushes down on the accelerator pedal, a downshift is prevented; otherwise the driving force would be increased, increasing the amount of the skid further.

Figure 7:
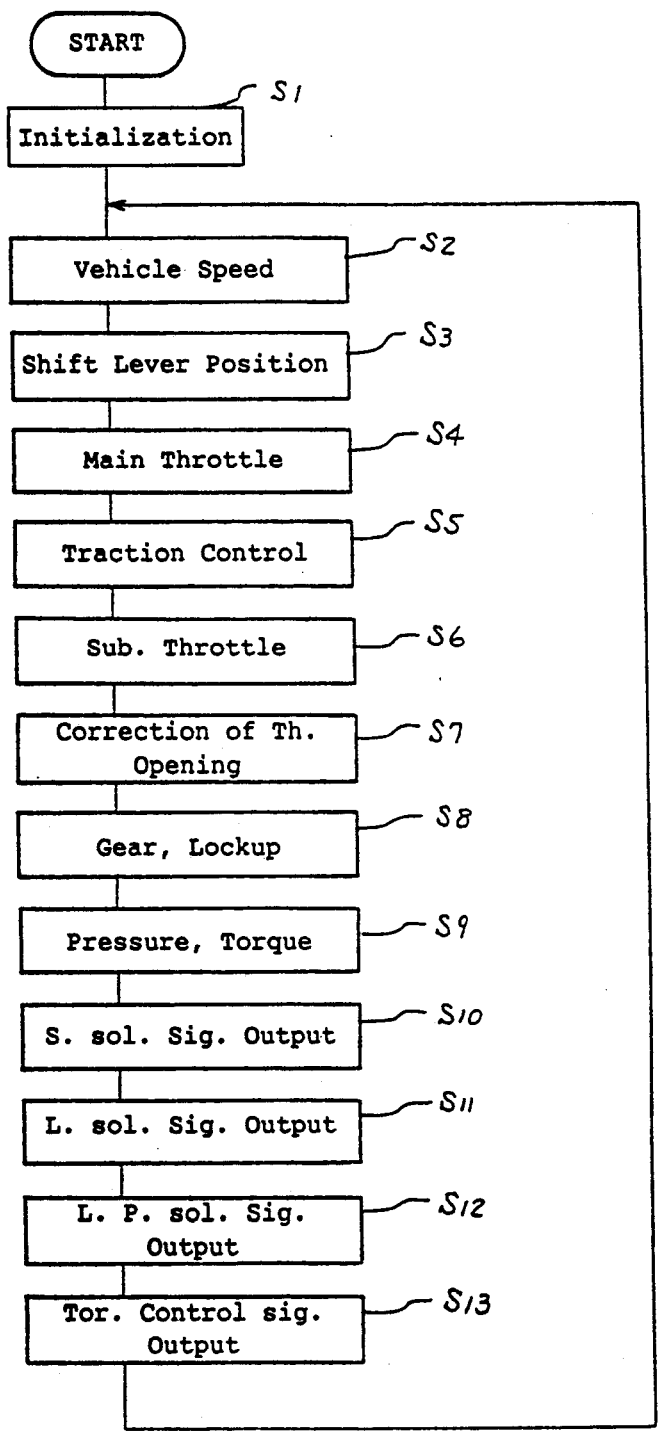
FIG. 7 is a general flowchart illustrating the operation of the electronically controlled automatic transmission shown in FIGS. 1 and 2.

The operation of the electronically controlled automatic transmission according to the invention is next described. FIG. 7 is a general flowchart illustrating the operation of the electronically controlled automatic transmission described in connection with FIGS. 1-4. The system is initialized (step 1). The vehicle speed is judged (step 2). The position of the shift lever is determined (step 3). The degree to which the main throttle is opened is judged (step 4). The traction control operation is judged (step 5). The degree to which the subsidiary throttle is opened is judged (step 6). The degree to which the throttle for controlling the line pressure and the engine torque is opened is corrected (step 7). The engaged gear and the lockup status are judged (step 8). The line pressure and the engine torque status are judged (step 9). Shift solenoid signals are produced to the shift solenoids 38 and 39 (step 10). The lockup solenoid signal is produced to the lockup solenoid 41 (step 11). The line pressure solenoid signal is produced to the line pressure solenoid 43 (step 12). The engine torque control signal is produced to the engine control module 28. (step 13).

In the example described first, when the throttle opening is corrected according to the opening of the subsidiary throttle, experiments are performed in practice to obtain data about the engine torque. Correcting values based on the data are obtained. The correcting values are held in a data map where the subsidiary throttle opening is a parameter. Data is read from the data map and used. The operation for this sequence is described below.

Figure 8:
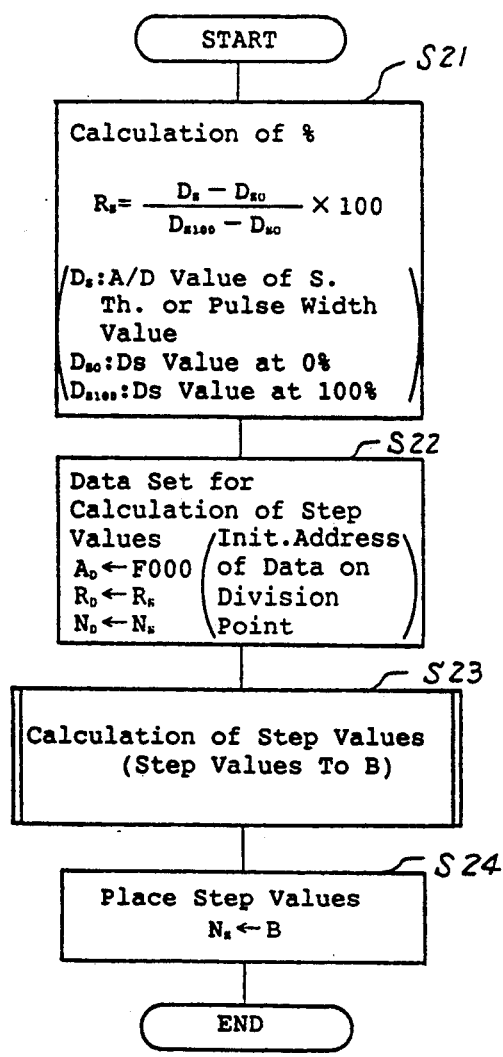
FIG. 8 is a flowchart illustrating a sequence of operations performed to make a decision on the degree to which the subsidiary throttle is opened.

FIG. 8 is a flowchart illustrating a sequence of operations performed to judge the degree to which the subsidiary throttle is opened. The degree to which the subsidiary throttle is opened is detected by the subsidiary throttle sensor 12 and converted into digital form, creating a step value.

In step 21, the percentage of the degree to which the subsidiary throttle is opened is calculated according to the formula:

$$Rs = \frac{(Ds - Ds_0)}{(Ds_{100} - Ds_0)} \times 100$$

where Ds is the digitized value of the degree to which the subsidiary throttle is opened or the value of the pulse width, $Ds_0$ is the value of Ds at 0%, and $Ds_{100}$ is the value of Ds at 100%.

In step 22, data for calculating the step value is placed. The value at address $A_D$ is placed at the initial address F000 of the data about the division point. The value of $R_D$ is taken as the degree Rs to which the subsidiary throttle is opened. The value of $N_D$ is taken as Ns. In step 23, the value of B that is the step value is set by a method described below. In step 24, B is taken as the value of Ns.

FIG. 9 is a diagram illustrating one example of a table of data about the division of the subsidiary throttle, the table being used when the step value is computed.

A method of correcting the throttle opening for controlling the line pressure and the engine torque according to the value of Ns of the subsidiary throttle opening computed as described above is next described.

Figure 10:
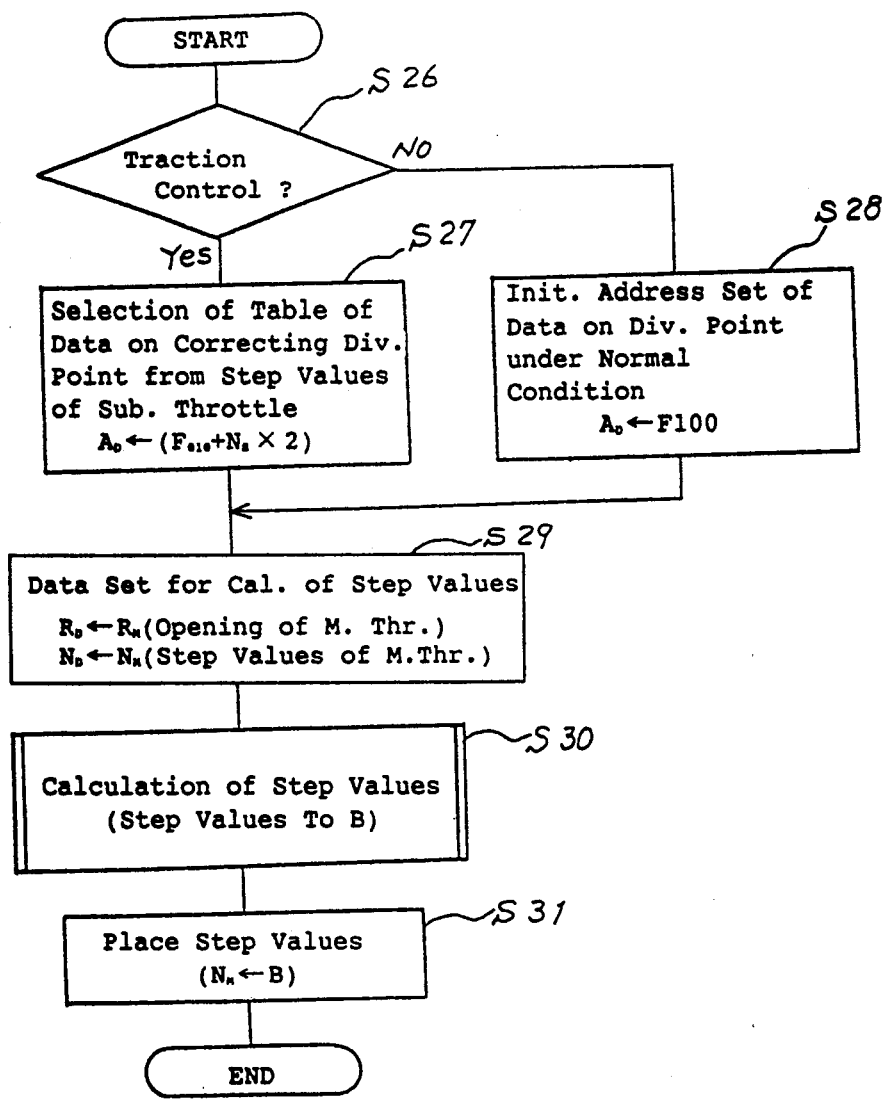
FIG. 10 is a flowchart illustrating a sequence of operations performed to correct the throttle opening which is used for the control of the line pressure and of the engine torque.

FIG. 10 is a flowchart illustrating a sequence of operations performed to correct the throttle opening that is used to control the line pressure and the engine torque. FIGS. 11(A)–(C) illustrate tables of data about the division point of the main throttle. FIG. 11(A) is a table of data about the division point of the main throttle under normal condition. FIG. 11(B) is a table of data about the division point of the main throttle when the traction control function is performed. FIG. 11(C) is a diagram in which data is compared with addresses, for selecting one out of the tables about the division point of the main throttle when the traction is under control. In step 26, a decision is made to see whether the traction is being controlled or not. If it is being controlled, control goes to step 27. In step 27, one table of data about the division point used for correction of the throttle opening is selected, depending on the step value Ns of the subsidiary throttle opening, and using FIGS. 11(B) and (C). At this time, the value of the initial address $A_D$ is set to (F010+Ns×2).

In step 28, if the traction is not under control, the value of the initial address $A_D$ of the data about the division point under normal condition is set to F100, the data being shown in FIG. 11(A).

In step 29, data for calculating the step value is set. The value of $R_D$ is taken as the main throttle opening $R_M$. The value of $N_D$ is taken as $N_M$. The value of the main throttle opening $R_M$ is found by a method (described later).

In step 30, the value of that is used as the step value is found by a method described later.

In step 31, B is taken as the value of $N_M$.

The degree (0–100%) to which the subsidiary throttle is opened is multiplied by the degree to which the main throttle is opened, to correct the throttle opening. This method is described in detail below.

Figure 12:
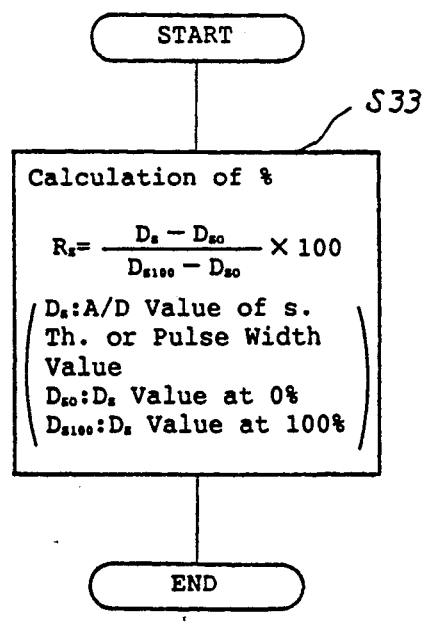
FIG. 12 is a flowchart illustrating a sequence of operations executed to make a decision on the degree to which the subsidiary throttle is opened.

FIG. 12 is a flowchart illustrating an operation performed to judge the degree to which the subsidiary throttle is opened. The opening of the subsidiary throttle detected by the subsidiary throttle sensor 12 is converted into digital form, creating a step value.

In step 33, the percentage of the degree to which the subsidiary throttle is opened is calculated in accordance with the formula:

$$Rs = \frac{(Ds - Ds_0)}{(Ds_{100} - Ds_0)} \times 100$$

where Ds is the digitized value of the degree to which the subsidiary throttle is opened or the value of the pulse width, $Ds_0$ is the value of Ds at 0%, and $Ds_{100}$ is the value of Ds at 100%. The throttle opening for controlling both line pressure and engine torque is corrected according to the subsidiary throttle opening Rs found in this way.

Figure 13:
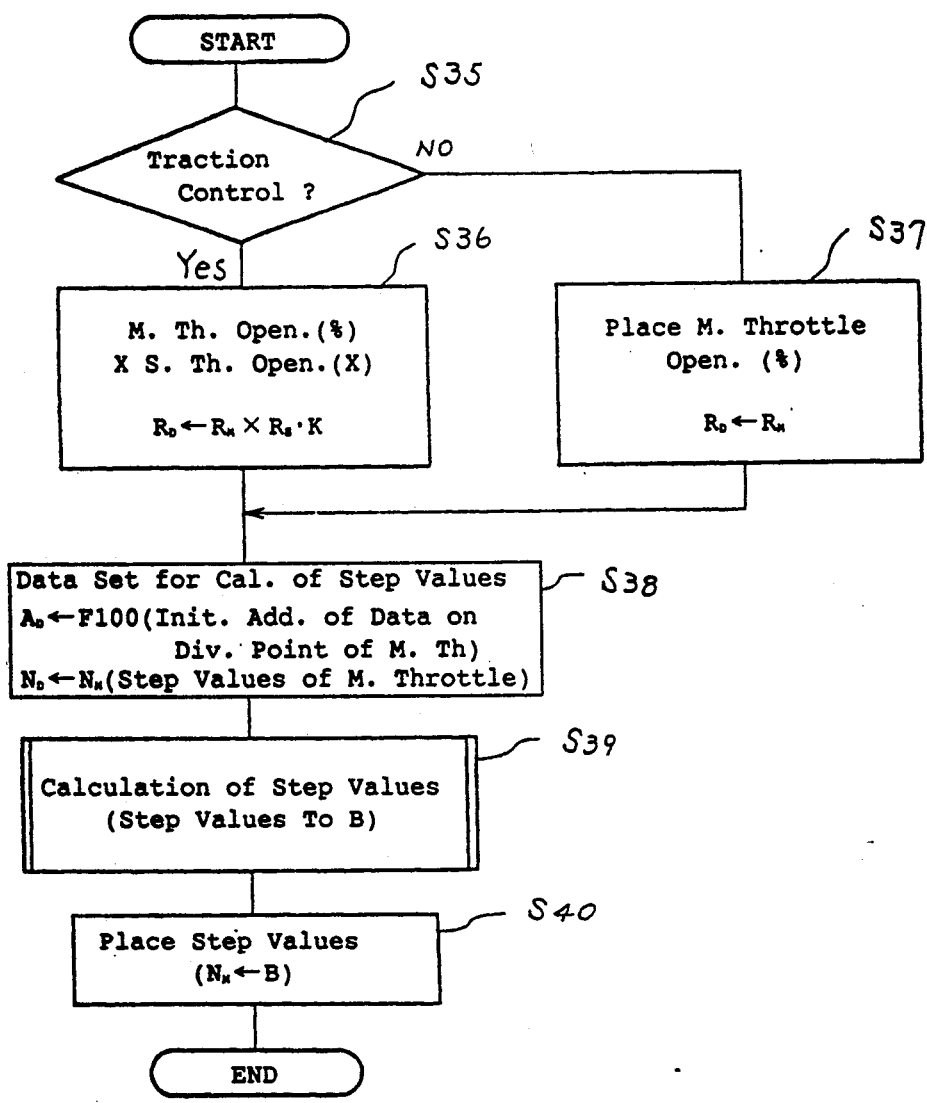
FIG. 13 is a flowchart illustrating a sequence of operations executed to correct the throttle opening which is used to control the line pressure and the engine torque.

FIG. 13 is a flowchart illustrating a sequence of operations executed to correct the throttle opening that is used to provide control of the line pressure and the engine torque. In step 35, a decision is made to ascertain whether the traction is currently under control. In step 36, if the traction is under control, the main throttle opening $R_M$ (%) is multiplied by the subsidiary throttle opening Rs (%). Let $R_M \times Rs.K$ be the value of the corrected throttle opening, where K is a coefficient which makes the corrected throttle opening $R_D$ have a desired value.

In step 37, if the traction is not presently under control, the main throttle opening $R_M$ (%) is set to $R_D$. In step 38, data for calculating the step value is placed. The value of the initial address $A_D$ of the data about the division point of the main throttle is set to F100. $N_D$ is set to $N_M$. In step 39, the value of B that is used as the step value is calculated by a method described later. In step 40, $N_M$ is set to B.

Figure 14:
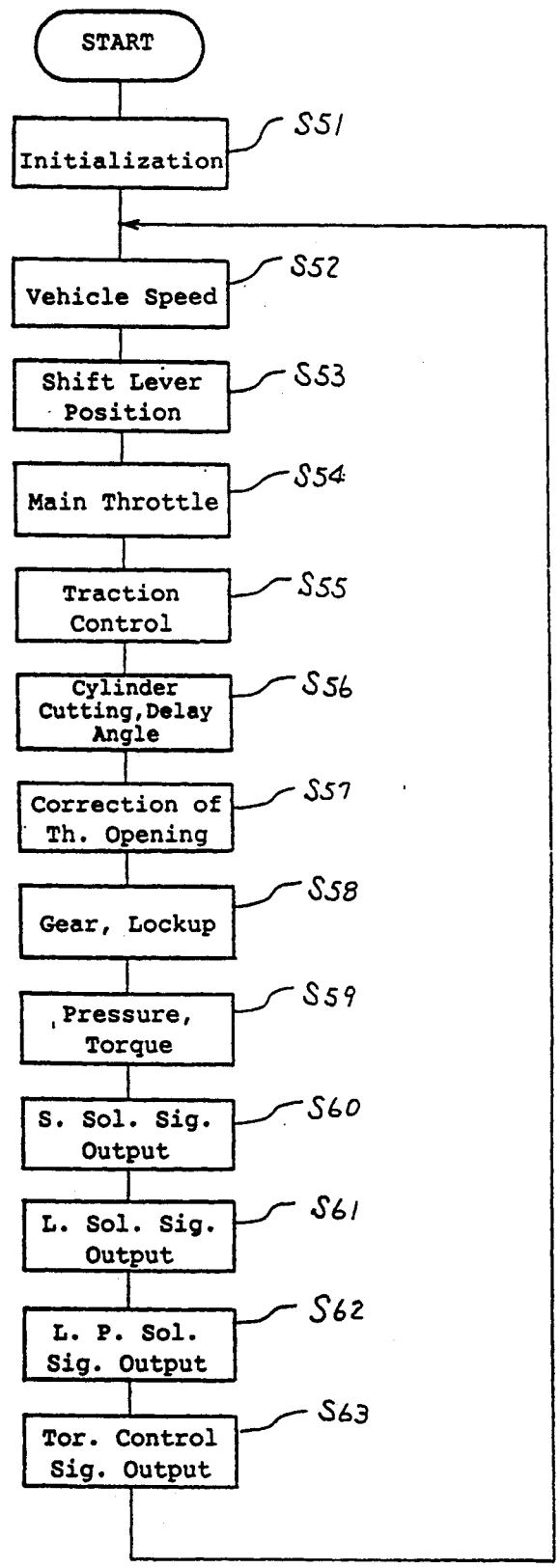
FIG. 14 is a general flowchart illustrating the operation of another electrically controlled automatic transmission according to the invention.

The operation of the electronically controlled automatic transmission described in connection with FIGS. 5 and 6 is described now. FIG. 14 is a general flowchart illustrating the operation of this electronically controlled automatic transmission. In step 51, the system is initialized. In step 52, the speed of the vehicle is judged. In step 53, the position of the shift lever is read. In step 54, the degree to which the main throttle is opened is judged. In step 55, a decision is done to see if the traction is being controlled. In step 56, the number of the cut cylinders and the status of the delay angle are judged. In step 57, the throttle opening for controlling both line pressure and engine torque is corrected. In step 58, the engaged gear in the transmission and the lockup are judged. In step 59, the line pressure and the engine torque are judged. In step 60, shift solenoid signals are produced to the shift solenoids 38 and 39. In step 61, the lockup solenoid signal is produced to the lockup solenoid 41. In step 62, the line pressure solenoid signal is produced to the line pressure solenoid 43. In step 63, the engine torque control signal is produced to the engine control module 28.

In this second example, where the throttle opening is corrected according to either the number of the cut cylinders or the delay angle, experiments are performed in practice to obtain data about the engine torque. Correcting values based on the data are obtained. The correcting values are held in a data map where the number of the cut cylinders or the delay angle is a parameter. Data is read from the data map.

Figure 15:
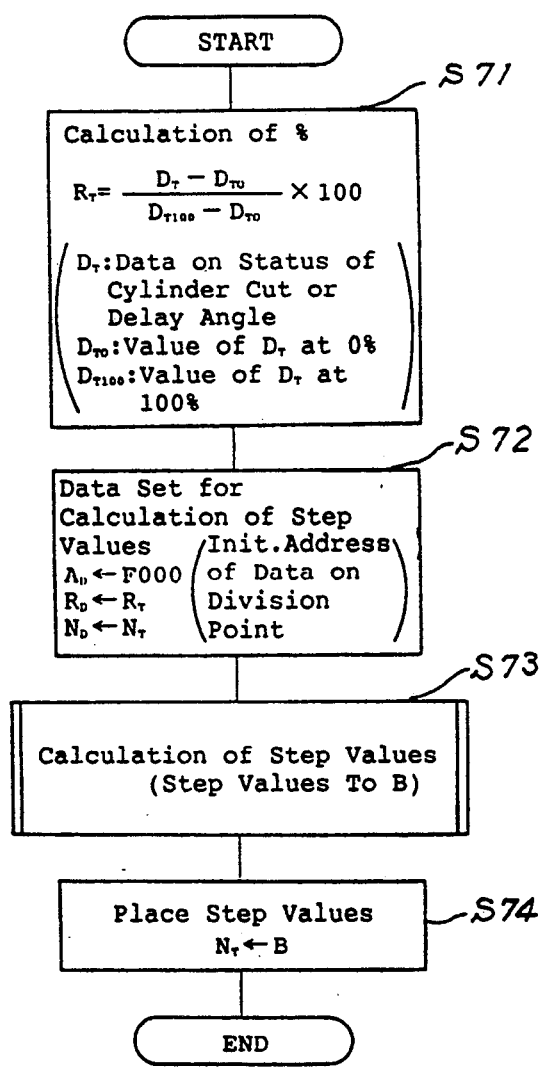
FIG. 15 is a flowchart illustrating a sequence of operations performed to make a decision on the reduction in the number of the cylinders and the delay angle.

FIG. 15 is a flowchart illustrating the operation performed to read the number of the cut cylinders and the delay angle. In step 71, the percentage of the cut cylinders and the status of the delay angle is calculated in accordance with the formula:

$$R_T = \frac{(D_T - D_{T0})}{(D_{T100} - D_{T0})} \times 100$$

where $D_T$ is the data about the cut cylinders or the delay angle, $D_{T0}$ is the value of $D_T$ at 0%, and $D_{T100}$ is the value of $D_T$ at 100%.

In step 72, data for calculating the step value is placed. The value of the initial address $A_D$ of the data about the division point is set to F000. $R_D$ is set to the throttle opening $R_T$. $N_D$ is set to $N_T$. In step 73, the value of B that is used as the step value is calculated. In step 74, the step value $N_T$ is set to B.

FIG. 16 is a diagram showing one example of a table of data about the division of the subsidiary throttle, the table being used when the step value is computed. The manner in which the throttle opening for controlling both line pressure and engine torque is corrected according to the step value $N_T$ of the subsidiary throttle opening calculated by the method described above is described now.

Figure 17:
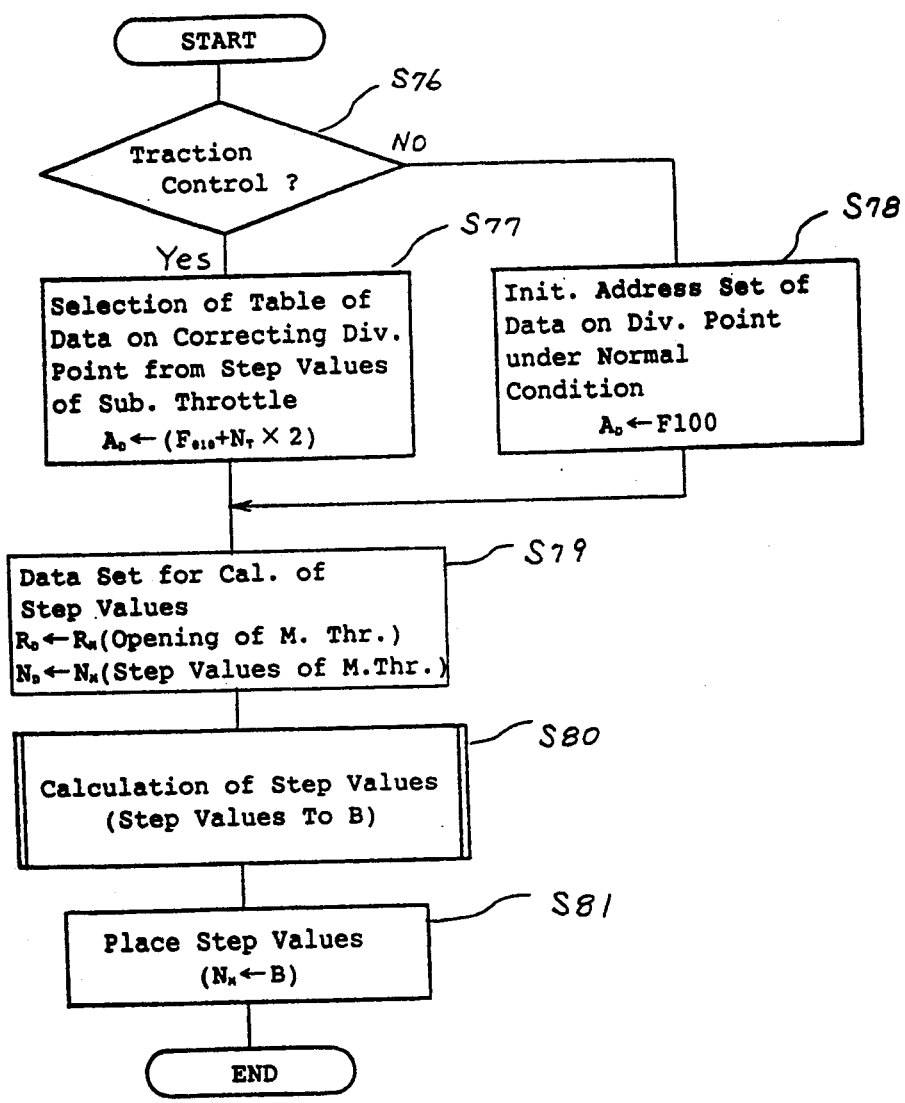
FIG. 17 is a flowchart illustrating a sequence of operations performed to correct the throttle opening which is used to control the line pressure and the engine torque.

FIG. 17 is a flowchart illustrating a sequence of operations performed to correct the throttle opening that is used to provide control of the line pressure and of the engine torque. FIG. 18(A)-(C) show tables of data regarding the division point of the main throttle. FIG. 18(A) is a table of data about the division point of the main throttle under normal condition. FIG. 18(B) is a table of data about the division point of the main throttle when the traction is under control. FIG. 18(C) compares data with addresses, and is used to select one table of data about the division point of the main throttle when the traction is under control.

In step 76, a decision is made to see whether the traction is being controlled or not. If the traction control function is presently performed, control proceeds to step 77, where one table of data about the division point which is used to correct the throttle opening is selected, using the step value $N_T$ of the subsidiary throttle opening as well as FIG. 18(B) and (C). At this time, the initial address $A_D$ is set to (F010+$N_T \times 2$).

In step 78, when the traction is not being controlled, the initial address $A_D$ of the data about the division point under normal condition as shown in FIG. 18(A) is set to F100. In step 79, data for calculating the step value is placed. The value of $R_D$ is taken as the main throttle opening $R_M$. The value of $N_D$ is taken as $N_M$. In step 80, the value of B that is used as the step value is found by a method described later. In step 81, $N_M$ is set to B.

The method of correcting the throttle opening by multiplying the main throttle opening by the percentage (0–100%) of the cut cylinders or the delay angle is now described.

Figure 19:
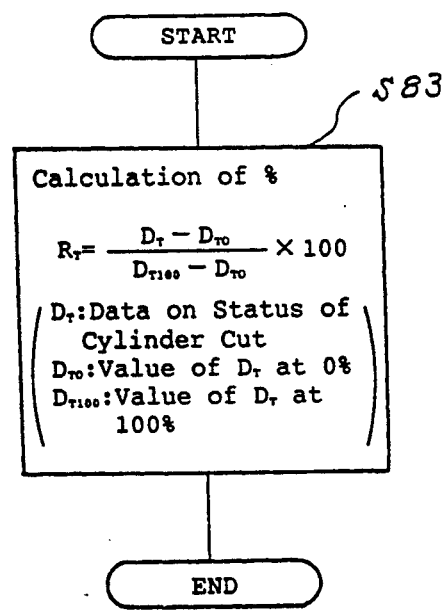
FIG. 19 is a flowchart illustrating a sequence of operations performed to make a decision on the reduction in the number of the cylinders and the delay angle.

FIG. 19 is a flowchart illustrating an operation performed to judge the cut cylinders and the delay angle. The status indicating the number of the cut cylinders and the delay angle is converted into digital form, thus creating a step value. In step 83, the percentage of the cut cylinders and the status of the delay angle is calculated in accordance with the formula:

$$R_T = \frac{(D_T - D_{T0})}{(D_{T100} - D_{T0})} \times 100$$

where $D_T$ is the data about the cut cylinders or the delay angle, $D_{T0}$ is the value of $D_T$ at 0%, and $D_{T100}$ is the value of $D_T$ at 100%.

The throttle opening for controlling both line pressure and engine torque is corrected according to the calculated percentage $R_T$ of the cut cylinders and the status of the delay angle.

Figure 20:
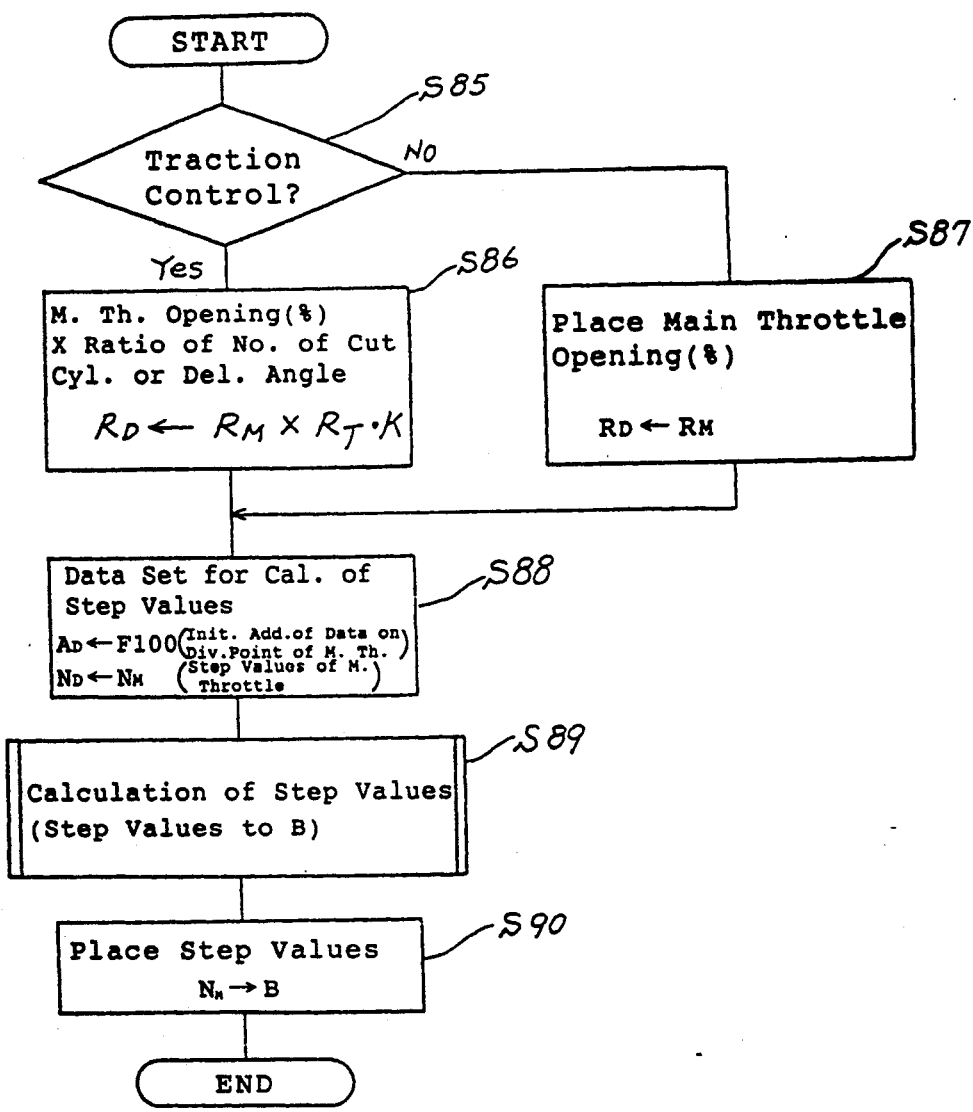
FIG. 20 is a flowchart illustrating a sequence of operations performed to correct the throttle opening which is used to control the line pressure and the engine torque.

FIG. 20 is a flowchart illustrating a sequence of operations performed to correct the throttle opening that is used to provide control of the line pressure and the engine torque. In step 85, a decision is made to see whether the traction is under control or not. In step 86, if the traction is under control, the main throttle opening $R_M$ (%) is multiplied by the percentage $R_T$ (%) of the cut cylinders and the status of the delay angle. The value of the corrected throttle opening $R_D$ is given by $R_M \times R_T \cdot K$, where K is a coefficient which makes the corrected throttle opening $R_D$ have a given value. In step 87, if the traction is not under control, the main throttle opening $R_D$ is set to $R_M$(%). In step 88, data for calculating the step value is placed. The initial address $A_D$ of the data about the division point of the main throttle is set to F100. $N_D$ is set to $N_M$. In step 89, the value of B that is used as a step value is calculated by a method described later. In step 90, $N_M$ is set to B.

Figure 21:
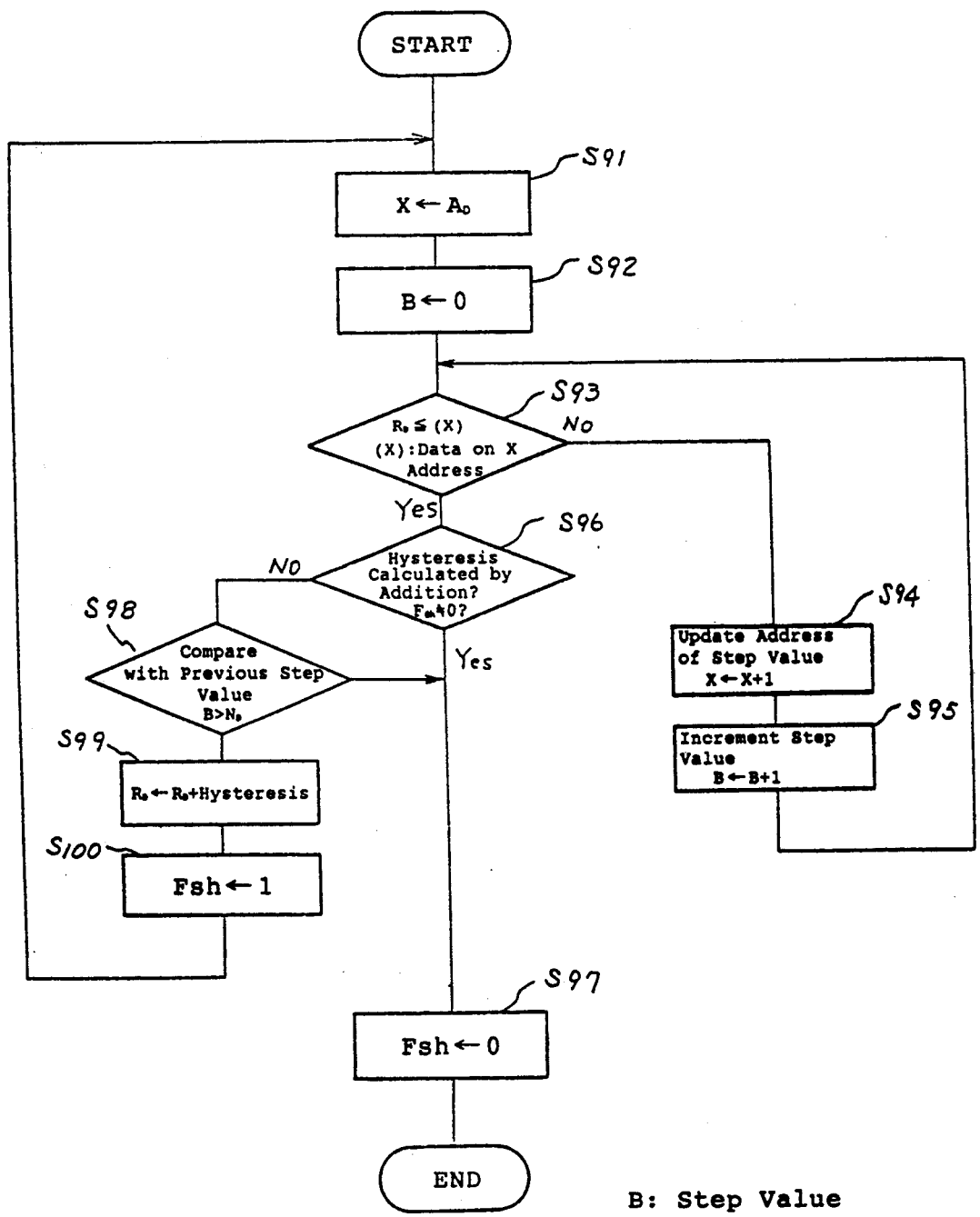
FIG. 21 is a flowchart illustrating a sequence of operations performed to calculate step values.

The method of calculating the value of B that is a step value in the execution of the above-described flowcharts is now described. FIG. 21 is a flowchart illustrating a sequence of operations carried out to calculate the step value. In step 91, address X is set to $A_D$. In step 92, the step value B is set to 0. In step 93, a decision is made to see whether the value of $R_D$ is less than the value placed at address X. If so, control goes to step 96. If so not, i.e., the value of $R_D$ is less than the value placed at address X, then control proceeds to step 94. In step 94, if the value of $R_D$ is not less than the value placed at address X, then the step value address is updataed, and the value at the address X is incremented by 1. In step 95, a step value is added to increase B to B+1, after which control goes back to step 93. In step 96, if the value of $R_D$ is less than the value at the address X, then a decision is made to determine whether the calculation relied on hysteresis addition, i.e., flag $F_{gh} \neq 0$. If the relation $F_{gh} \neq 0$ holds, then control goes to step 97. If not so, control proceeds to step 98. In step 97, the flag $F_{gh}$ is set to 0. In step 98, the present step value is compared with the previous step value, and a decision is made to see if the relationship B>$N_D$ (the previous step value) holds. In step 99, $R_D$ is set to ($R_D$+hysteresis). In step 100, the flag $F_{gh}$ is set to 1, after which control goes back to step 91.

Figure 22:
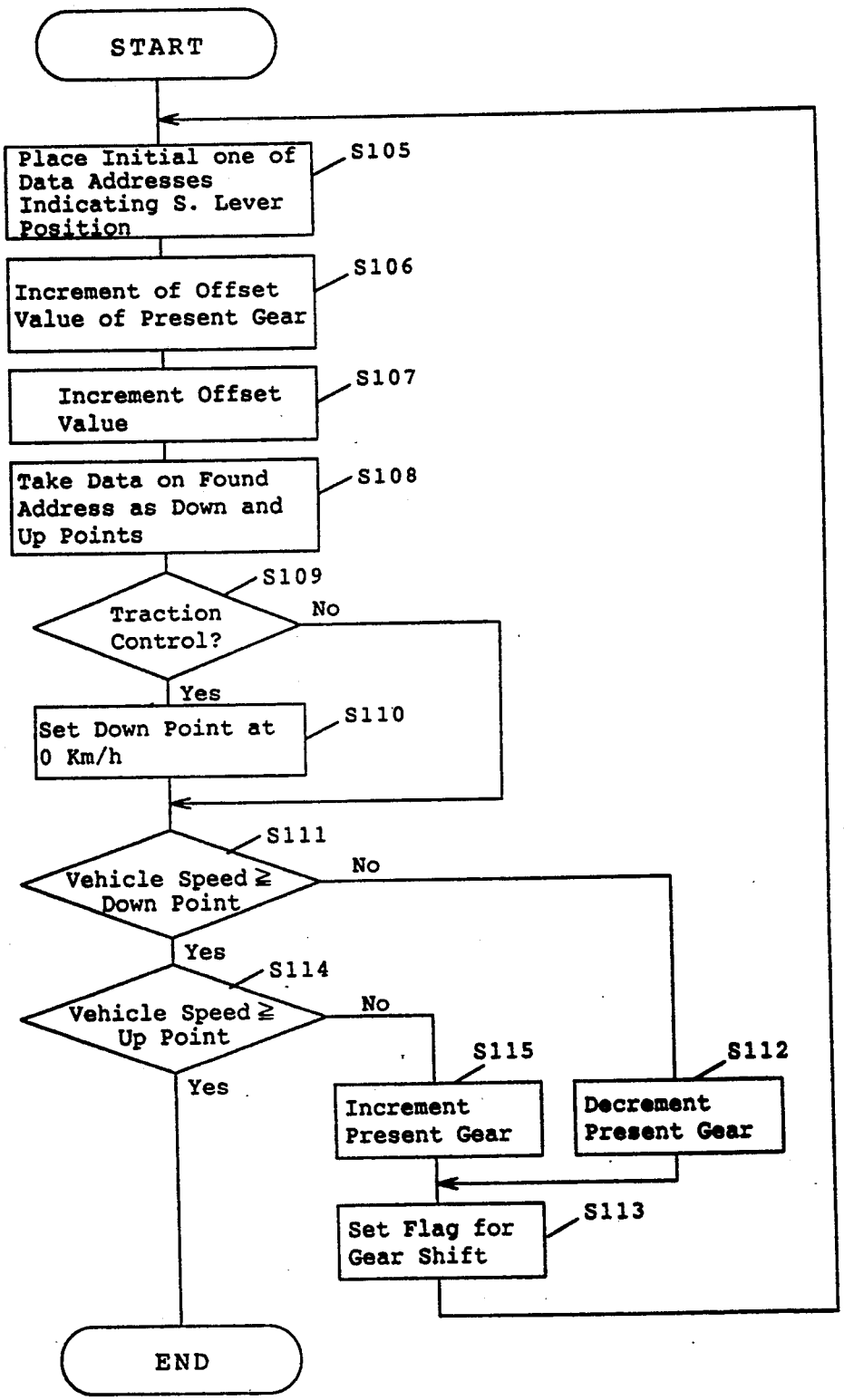
FIG. 22 is a flowchart illustrating a sequence of operations performed to determine whether an electronically controlled automatic transmission according to the invention should produce a shift.

A decision made in the novel electronically controlled automatic transmission to determine whether a shift should be made is next described. FIG. 22 is a flowchart illustrating a sequence of operations performed to determine whether a shift should be made. In step 105, the initial address of data indicating the shift lever position is set. In step 106, an offset value of the engaged gear that is presently judged is added to the value of the initial address in a shift point table. In step 107, an offset value of the throttle opening is added. In step 108, the data about the speed at the address is taken as a down point and as an up point, the speed having been found by the addition of the offset value. In step 109, a decision is made to see whether the traction is now under control. If not so, control goes to step 111. In step 110, the down point is set to 0 km/h. Thus, a downshift is prevented during the control of the traction. In step 111, a decision is made to ascertain whether the vehicle speed is in excess of the down point. In step 112, if the down point is less than the vehicle speed, then the presently judged gear is shifted to the next lower gear, and control goes to step 113. In step 113, a flag for judging the shift is set. In step 114, if the vehicle speed is in excess of the down point, a decision is made to determine whether the vehicle speed is in excess of the up point or not. If the speed is less than the up point, control proceeds to step 115. In step 115, an upshift into the next higher speed is made.

Figure 23:
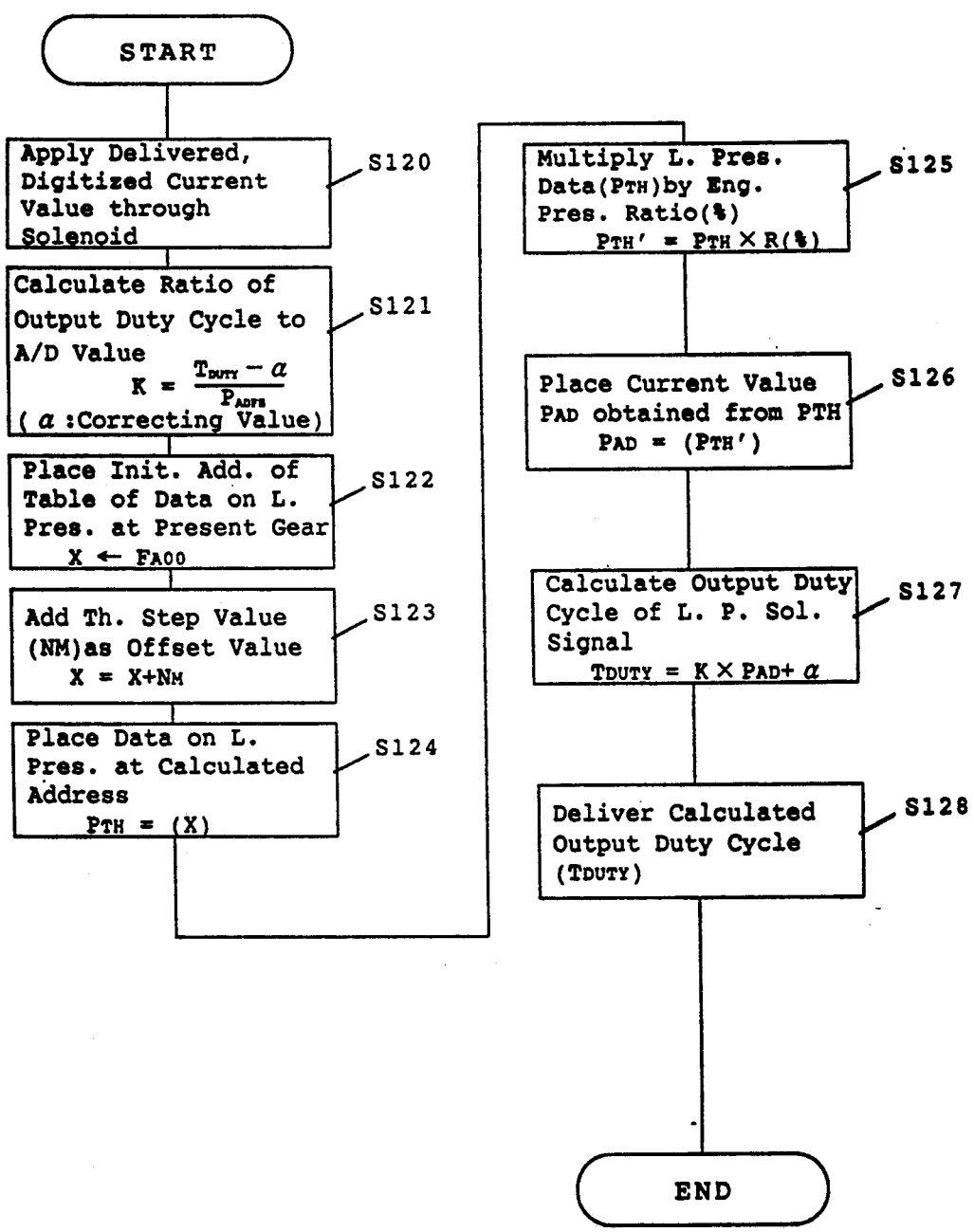
FIG. 23 is a flowchart illustrating a sequence of operations performed to cause an electronically controlled automatic transmission according to the invention to produce a line pressure solenoid signal.

The operation of the line pressure solenoid in the novel electronically controlled automatic transmission is next described. FIG. 23 is a flowchart illustrating a sequence of operations performed to produce a line pressure solenoid signal in the novel electronically controlled automatic transmission. FIG. 24 is a table in which data about the line pressure is compared with addresses. FIG. 25 is a diagram illustrating one example of a table of data about the line pressure.

In step 120, the digitized output current from the line pressure solenoid 43 is received. In step 121, the ratio of the output duty cycle to the digitized current value is calculated.

$$K = (T_{DUTY} - a)/P_{ADFR}$$

where $T_{DUTY}$ is the output duty cycle, $P_{ADFB}$ is the digitized feedback current value, and $a$ is a correcting value.

In step 122, the initial address of the table of data about the line pressure for the currently engaged gear is set to FA00. In step 123, the step value $N_M$ about the throttle is added as an offset value. That is, $$X = X + N_M.$$

In step 124, the calculated data (X) about the line pressure at the address X is placed. That is, $$P_{TH} = (X).$$

In step 125, the line pressure data $P_{TH}$ is multiplied by the engaging pressure ratio R(%).

$$P_{TH}' = P_{TM} \times R(\%).$$

In step 126, the current value $P_{AD}$ obtained when the line pressure data is $P_{TH}'$ is placed.

$$P_{AD} = (P_{TH}').$$

In step 127, the duty cycle ($T_{DUTY}$) of the output line pressure solenoid signal is calculated in the manner below.

$$T_{DUTY} = K \times P_{AD} + a.$$

In step 128, the calculated duty cycle ($T_{DUTY}$) of the output is delivered.

Figure 26:
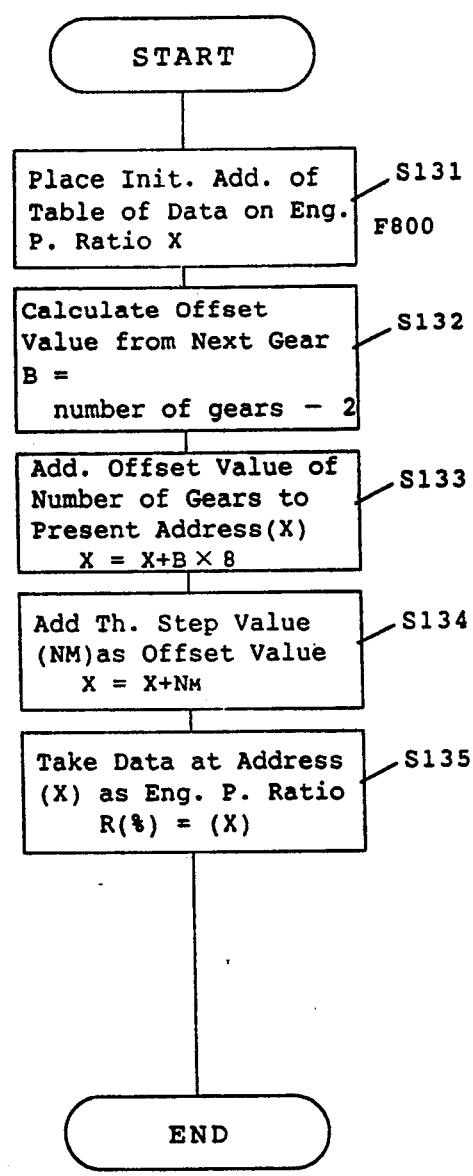
FIG. 26 is a flowchart illustrating a sequence of operations performed to calculate data about the engaging pressure ratio.
Figure 27:
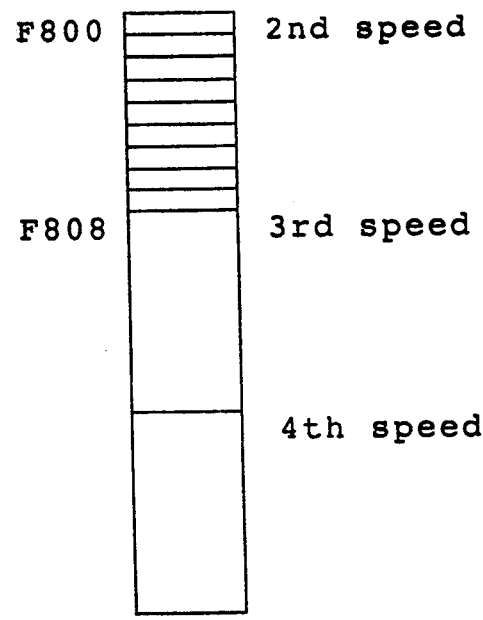
FIG. 27 is a diagram illustrating one example of table of data about the engaging pressure ratio.

The method of calculating the engaging pressure ratio data by which the line pressure data is multiplied is described now. FIG. 26 is a flowchart illustrating a sequence of operations performed to calculate the data about the engaging pressure ratio. FIG. 27 is a diagram showing one example of a table of data about the engaging pressure ratio. In step 131, F800 is placed at the initial address X of the table of the data about the engaging pressure ratio. In step 132, the offset value is calculated from the previously engaged gear. Where an upshift is produced, the minimum reduction in the number of the stages of the gears is two. Therefore, "2" is subtracted from B. That is, $$B = \text{the present stage number of gear} - 2.$$

In step 133, the offset value of the stage number of the gear is added to the data (X) at the present address X. Since the throttle opening is divided into 8 in the table of the data about the engaging pressure ratio, the data B about the stage number of the gear is multiplied by 8. That is, $$X = X + B \times 8.$$

In step 134, the data $N_M$ about the step value of the throttle is added as an offset value.

$$X = X + N_M.$$

In step 135, the data at the address X is taken as the engaging ratio data (X) and placed.

$$R(\%) = (X).$$

Figure 29A:
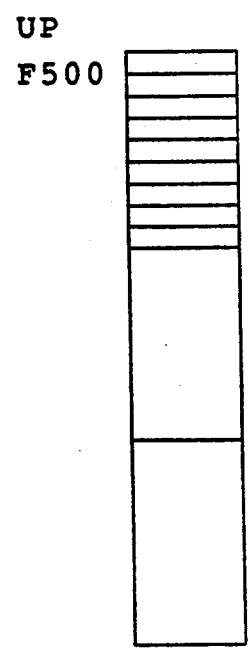
FIG. 29(A) is a diagram illustrating one example of table of data about reductions in the engine torque, the data being used for upshifts.
Figure 29B:
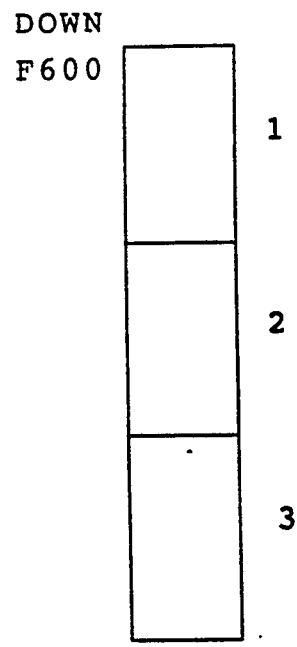
FIG. 29(B) is a diagram illustrating one example of table of data about reductions in the engine torque, the data being used for downshifts.
Figure 28:
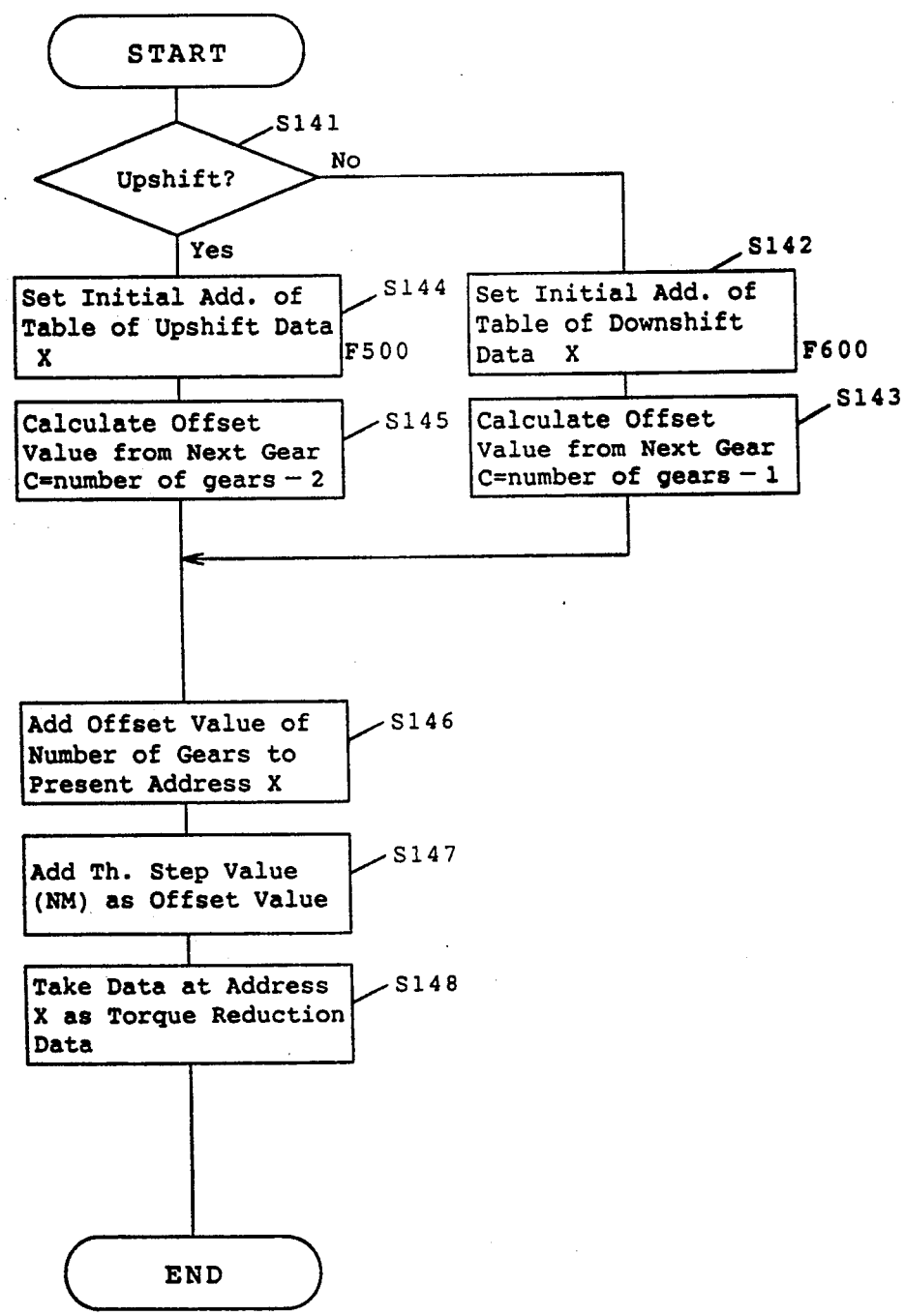
FIG. 28 is a flowchart illustrating a sequence of operations performed to calculate the data about reductions in the engine torque.

The method of calculating the data about reductions in the engine torque is next described. FIG. 28 is a flowchart illustrating a sequence of operations done to calculate the data on reductions in the engine torque. FIG. 29(A)-(B) show examples of a table of data about reductions in the engine torque. FIG. 29(A) is a table of data about upshifts. FIG. 29(B) is a table of data about downshifts.

In step 141, a decision is made to see whether an upshift should be made. In step 142, if an upshift should not be produced, the initial address X of the table of the data about the downshifts shown in FIG. 29(B) is set to F600. In step 143, the offset value is calculated from the previously engaged gear, after which control goes to step 146. When a downshift is produced, the minimum value of the shift to the next gear is 1 and so 1 is subtracted.

$$C = \text{the present stage number of gear} - 1.$$

In step 144, if an upshift is made, the initial address X of the table of the data is set to F500 as shown in FIG. 29(A). In step 145, the offset value is calculated from the previously engaged gear. Since the minimum reduction in the number of the stages of the gears is two, 2 is subtracted.

$$C = \text{the present stage number of gear} - 2.$$

In step 146, the offset value of the stage number of the gear is added to the data at the present address X.

$$X = X + C \times 8.$$

In step 147, the step value $N_M$ of the throttle is added as an offset value.

$$X = X + N_M.$$

In step 148, the data at the address X is placed as the data (X) about the reduction in the torque.

$$D_{TC} = (X).$$

The status of the control of the line pressure and the engine torque is judged according to the data about the line pressure engaging ratio R and the data $D_{TC}$ about the reduction in the engine torque found in the manner described above. This judgment is made in the manner described now.

Figure 30:
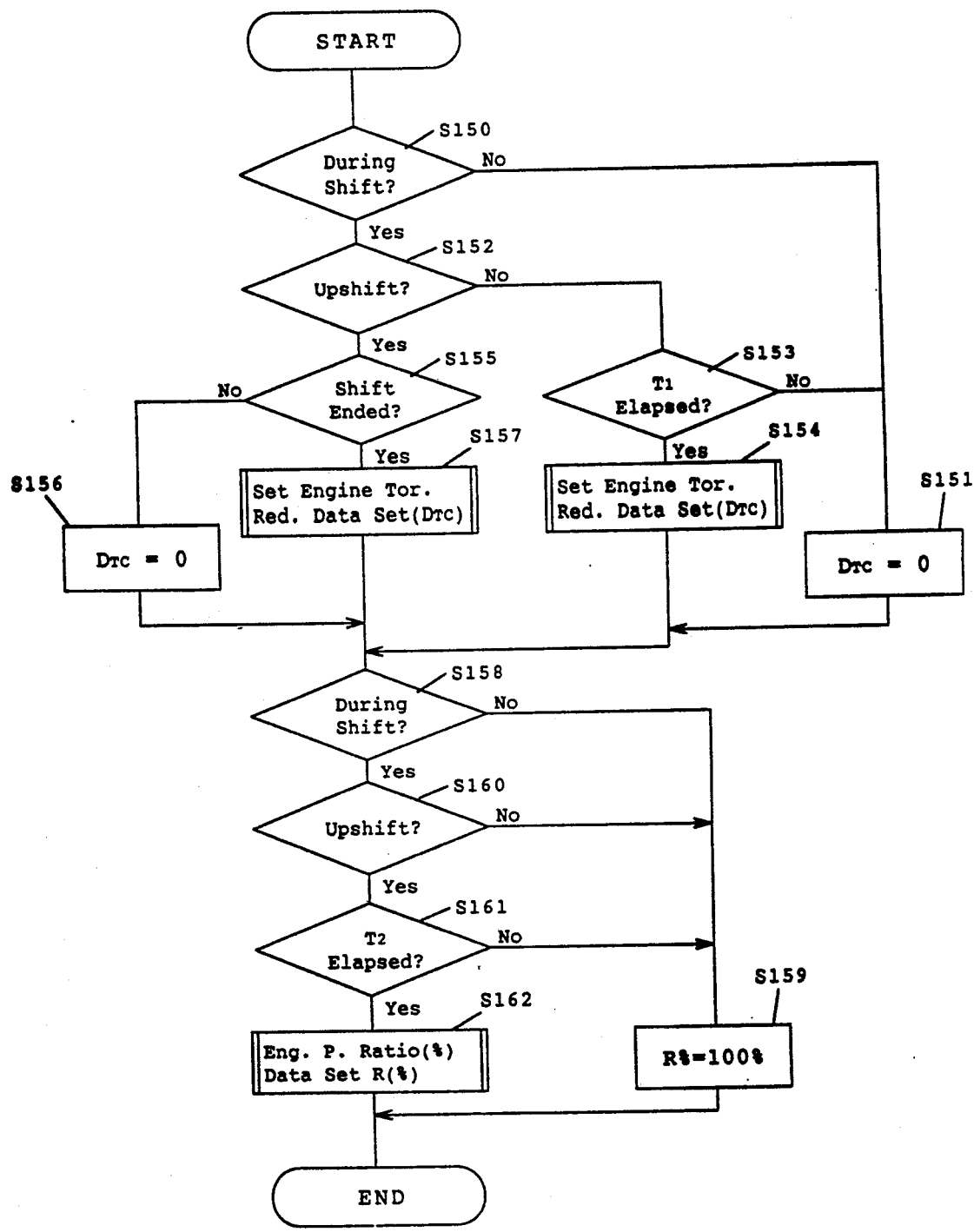
FIG. 30 is a flowchart illustrating a sequence of operations performed to control the line pressure and the engine torque.
Figure 31:
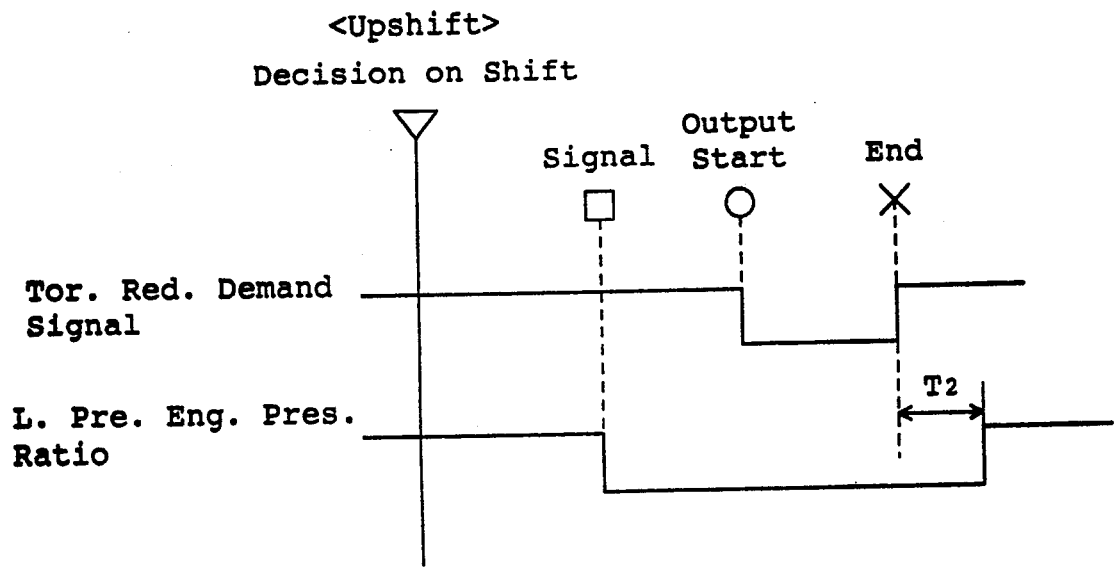
FIG. 31 is a time chart of a torque reduction demand signal and the engaging pressure ratio which are produced when upshifts are made.
Figure 32:
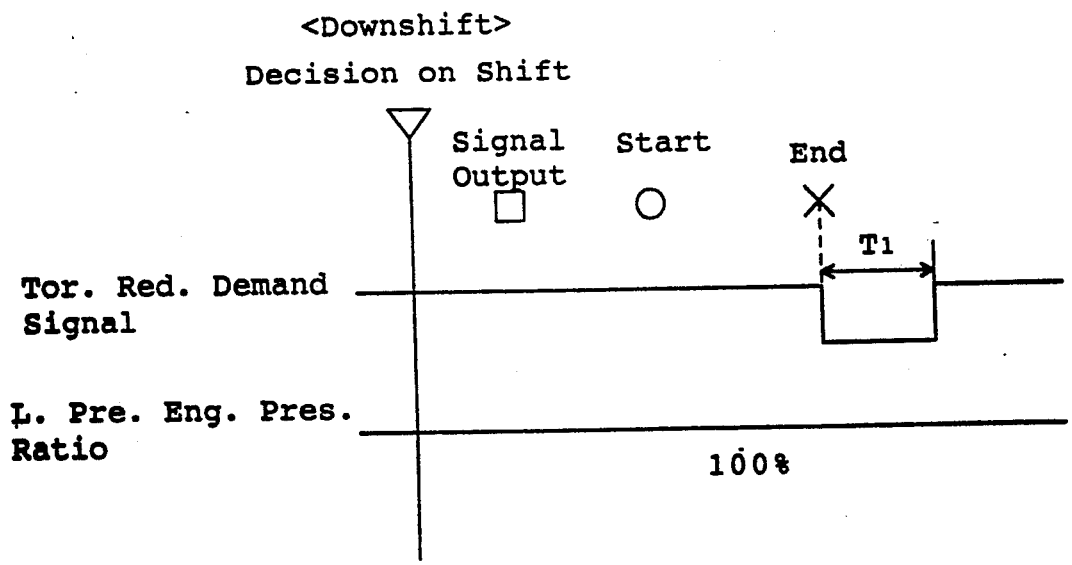
FIG. 32 is a time chart of the torque reduction demand signal and the engaging pressure ratio which are produced when downshifts are made.

FIG. 30 is a flowchart illustrating a sequence of operations performed to judge the status of the control of the line pressure and the engine torque. FIG. 31 is a time chart of the torque reduction demand signal produced on an upshift and the engaging pressure ratio. FIG. 32 is a time chart of the torque reduction demand signal produced on a downshift and the engaging pressure ratio.

In step 150, a decision is made to see whether a shift is being made. In step 151, if not so, the engine torque reduction data $D_{TC}$ is set to 0, i.e., $D_{TC}=0$. In step 152, a decision is made to determine whether an upshift should be produced. In step 153, if an upshift should not be produced, a check is made to see if a time of $T_1$ has elapsed since the completion of the shift. If not so, control goes to step 151. In step 154, the engine torque reduction data $D_{TC}$ is set. In step 155, if an upshift is produced, a decision is made to ascertain whether the shift was started and has ended. In step 156, if the shift was initiated and has not yet ended, the engine torque reduction data $D_{TC}$ is set to 0, i.e., $D_{TC}=0$. In step 157, if the shift was started and has ended, the engine torque reduction data $D_{TC}$ is set. In step 158, a decision is made to determine whether a shift is being produced. In step 159, if a shift is not being produced, the line pressure is maintained with R %=100%. In step 160, a decision is made to see if an upshift should be made. If not so, control goes to step 159, where the line pressure is maintained with R %=100% as shown in FIG. 32. In step 161, a decision is made to ascertain whether a time of $T_2$ has elapsed since a shift signal has been produced. If so, control goes to step 162. If not so, control proceeds to step 159. In step 162, the engaging pressure ratio data R(%) is set at the timing shown in FIG. 31.

Figure 33:
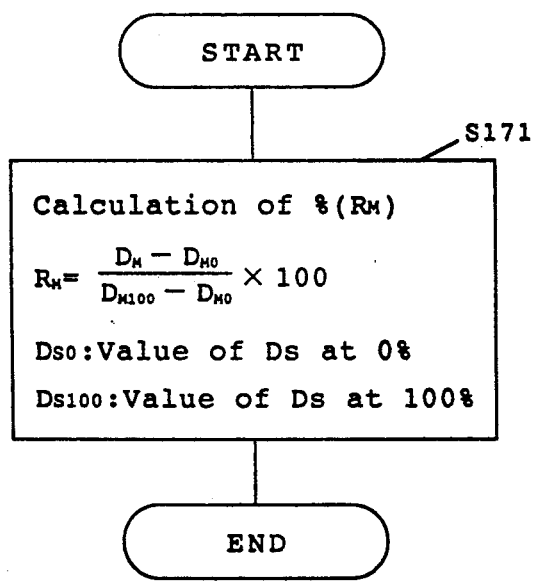
FIG. 33 is a flowchart illustrating an operation performed to calculate the degree to which the main throttle is opened.

The method of calculating the main throttle opening $R_M$ in the execution of the flowcharts described above is described now. FIG. 33 is a flowchart illustrating an operation effected to calculate the main throttle opening. In step 171, the percentage of the main throttle opening $R_M$ is computed.

$$R_M = \frac{(D_M - D_{M0})}{(D_{M100} - D_{M0})} \times 100$$

where $D_{s0}$ is the value of $D_s$ at 0%, and $D_{s100}$ is the value of $D_s$ at 100%.

It is to be understood that the present invention is not limited to the above examples and that various changes and modifications may be made within the spirits and the scope of the present invention.

What is claimed is:

1. An electronically controlled automatic transmission comprising:

skid-detecting means for detecting skid of the wheels of a vehicle and for generating skid signals responsive to detection of skid;

traction control means for receiving said skid signals from the skid-detecting means and for generating a torque signal in accordance with said skid signals;

engine control means for reducing engine torque responsive to said torque signal from the traction control means; and transmission control means for receiving at least one of the torque signal from the traction control means and the skid signal from the engine control means and for reducing hydraulic line pressure in the transmission by a predetermined value only when the traction control means is operating.

* * * * *